United States Patent
Manova-Elssibony

(10) Patent No.: US 10,608,459 B2
(45) Date of Patent: *Mar. 31, 2020

(54) WIRELESS CHARGING DEVICE

(71) Applicant: Humavox Ltd., Kfar-Saba (IL)

(72) Inventor: Asaf Manova-Elssibony, Tel-Aviv (IL)

(73) Assignee: Humavox, Ltd., Kfar-Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,970

(22) Filed: Aug. 6, 2018

(65) Prior Publication Data

US 2018/0375369 A1 Dec. 27, 2018

Related U.S. Application Data

(62) Division of application No. 14/912,129, filed as application No. PCT/IL2014/050729 on Aug. 14, 2014, now Pat. No. 10,050,463.

(51) Int. Cl.
| | |
|---|---|
| *H02J 7/00* | (2006.01) |
| *H02J 7/02* | (2016.01) |
| *H02J 50/70* | (2016.01) |
| *H02J 50/40* | (2016.01) |
| *H02J 50/80* | (2016.01) |
| *H02J 50/20* | (2016.01) |
| *H02J 50/60* | (2016.01) |
| *H04B 5/00* | (2006.01) |

(52) U.S. Cl.
CPC ............. *H02J 7/025* (2013.01); *H02J 50/20* (2016.02); *H02J 50/40* (2016.02); *H02J 50/60* (2016.02); *H02J 50/70* (2016.02); *H02J 50/80* (2016.02); *H04B 5/0037* (2013.01)

(58) Field of Classification Search
CPC ........ H02J 7/025; H01F 38/14; Y02T 90/122; B60L 11/182; Y02E 60/12
USPC ........................................ 320/108
See application file for complete search history.

(56) References Cited

U.S. PATENT DOCUMENTS

| | | |
|---|---|---|
| 2005/0107042 A1 | 5/2005 | Graauw |
| 2007/0236296 A1 | 10/2007 | Lee et al. |
| 2009/0001941 A1 | 1/2009 | Hsu et al. |
| 2011/0053500 A1* | 3/2011 | Menegoli ............... H02J 5/005 455/41.1 |
| 2011/0086598 A1 | 4/2011 | Ali et al. |
| 2013/0052967 A1 | 2/2013 | Black et al. |
| 2013/0057082 A1 | 3/2013 | Takada et al. |
| 2013/0062966 A1 | 3/2013 | Verghese et al. |
| 2013/0175874 A1 | 7/2013 | Lou et al. |

(Continued)

OTHER PUBLICATIONS

International Search Report dated Feb. 19, 2015 for PCT/IL2014/050729.

*Primary Examiner* — Arun C Williams
(74) *Attorney, Agent, or Firm* — Maxwell L. Minch; GrayRobinson, P.A.

(57) ABSTRACT

A wireless charging device comprises a transmitter coupled to at least one transmitting antenna and operable to cause the at least one transmitting antenna to emit electromagnetic radiation; a conductive structure adapted to confine the electromagnetic radiation to a charging zone; and a detector for detecting a degree of impedance mismatch between the transmitter and the at least one transmitting antenna. A receiver for use with the wireless charging device and a wireless charging system are also disclosed.

18 Claims, 25 Drawing Sheets

(56) References Cited

U.S. PATENT DOCUMENTS

| | | |
|---|---|---|
| 2013/0231155 A1 | 9/2013 | Sheynman et al. |
| 2013/0281167 A1 | 10/2013 | Cho et al. |
| 2014/0084688 A1* | 3/2014 | Tzanidis ................ H01F 38/14 |
| | | 307/42 |
| 2014/0167878 A1 | 6/2014 | Lee |
| 2014/0285016 A1 | 9/2014 | Tetu et al. |
| 2014/0314170 A1* | 10/2014 | Plumb ............... H04W 52/0261 |
| | | 375/282 |
| 2015/0288067 A1* | 10/2015 | Kwon ................ H01Q 9/0407 |
| | | 320/108 |

* cited by examiner

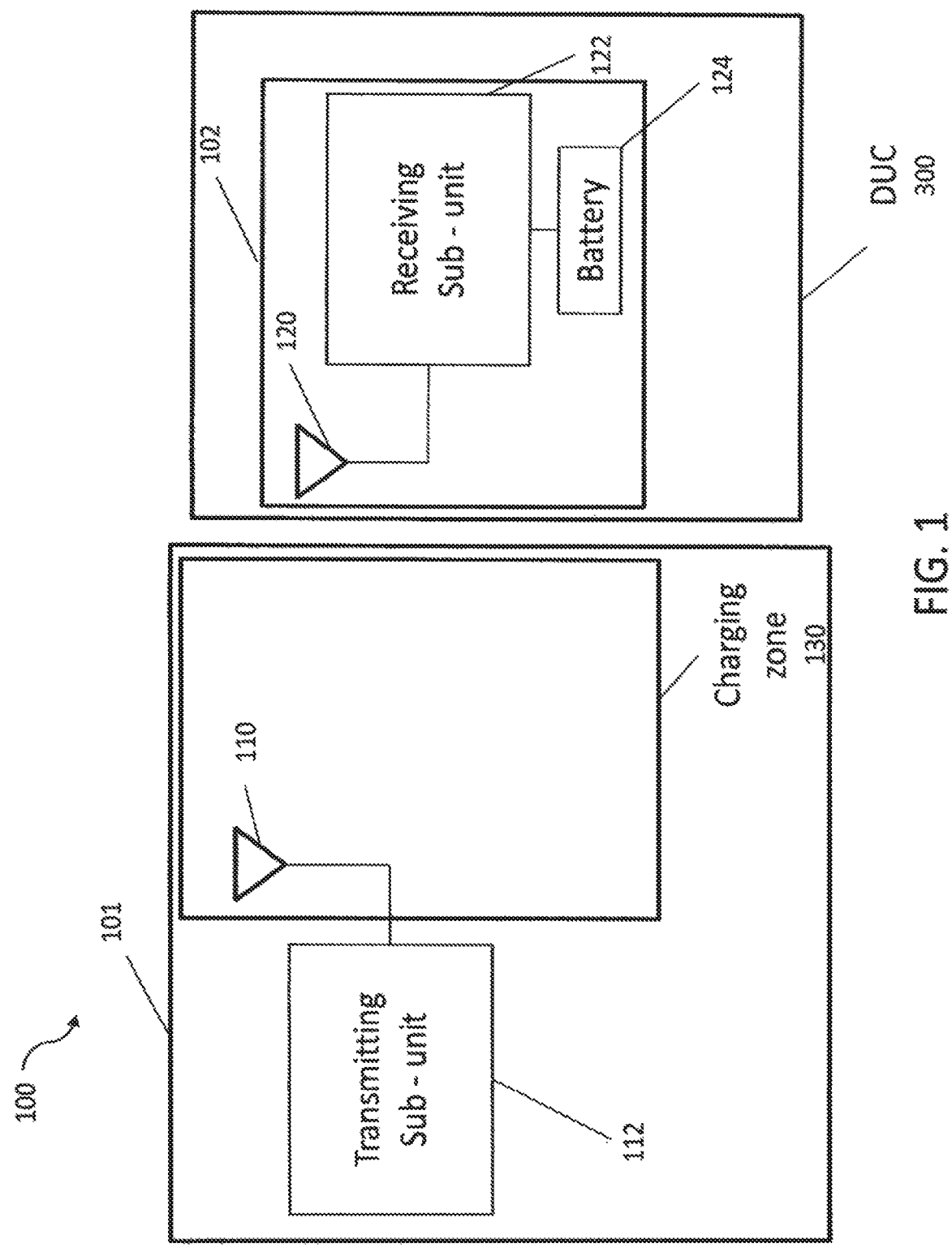

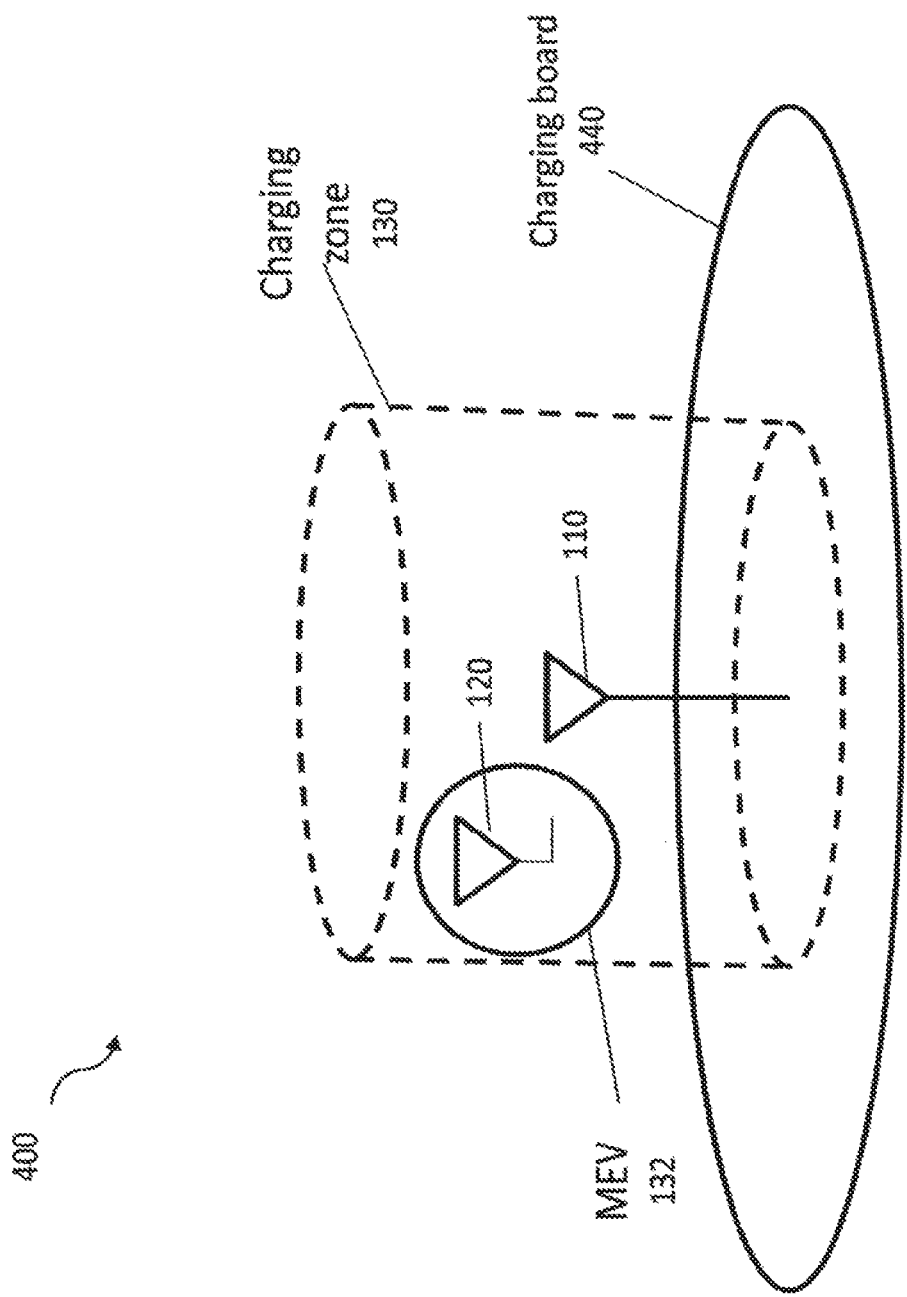

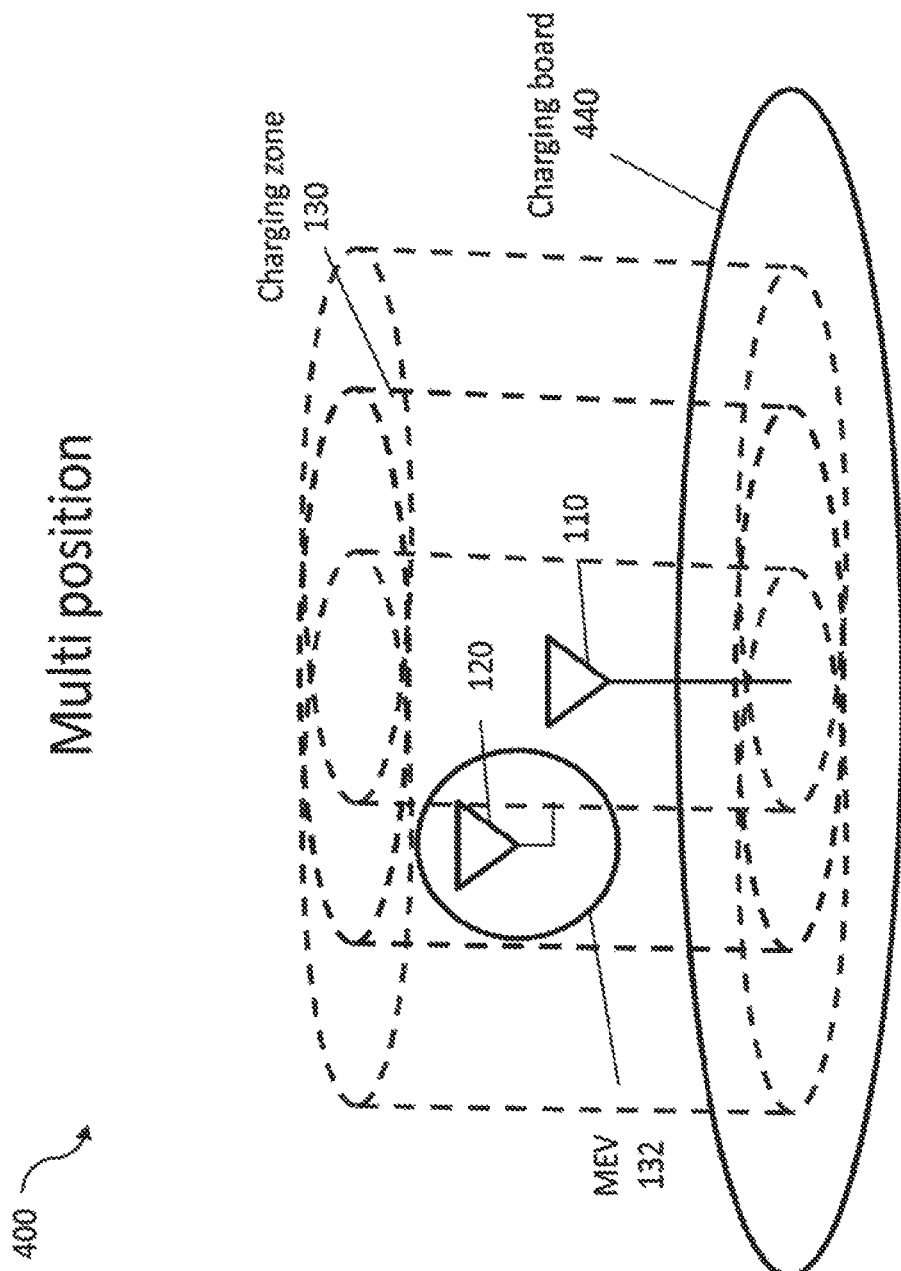

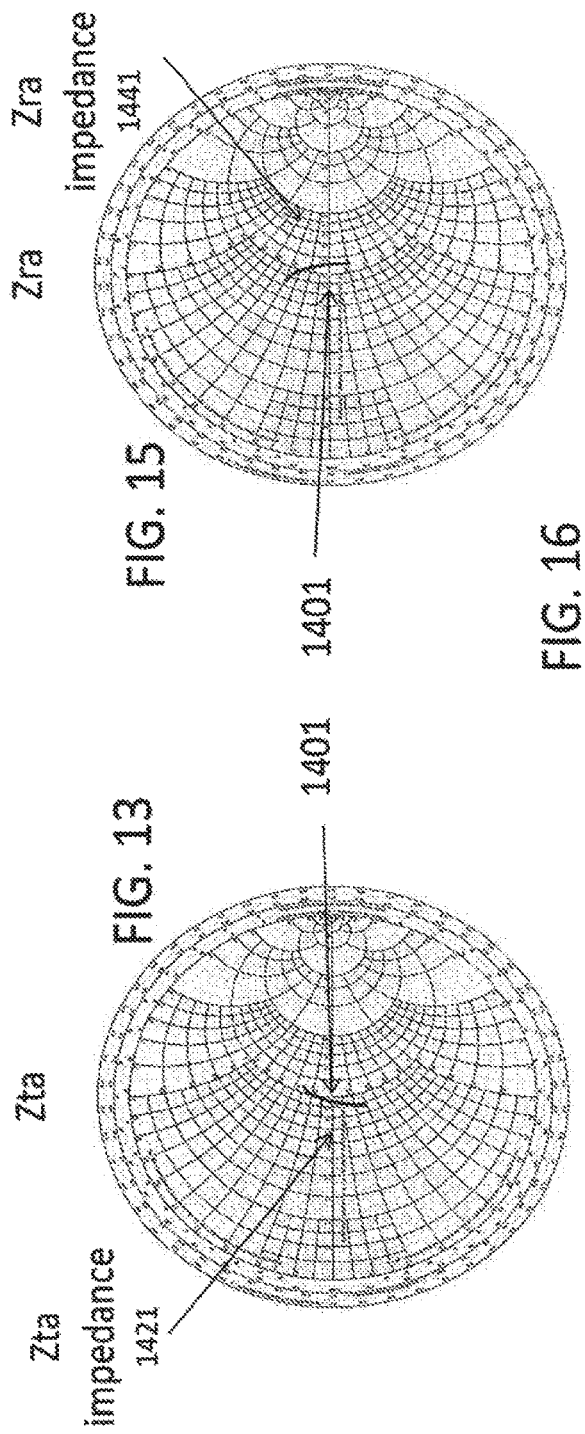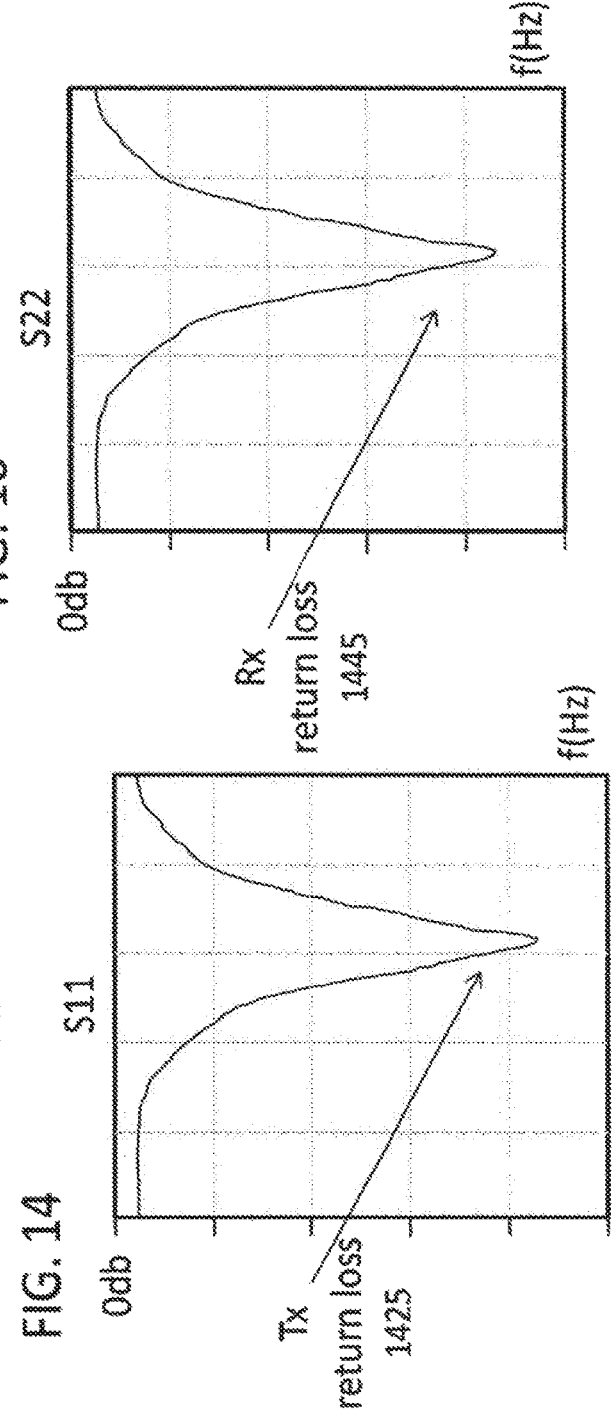

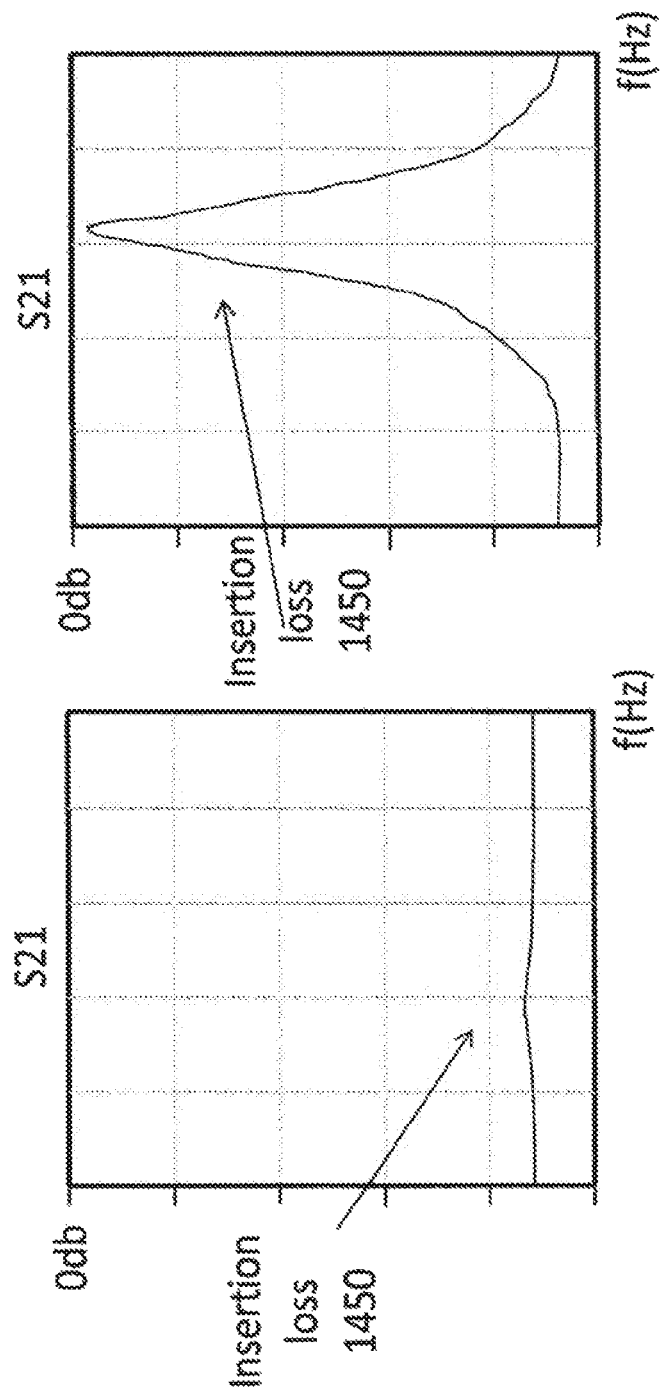

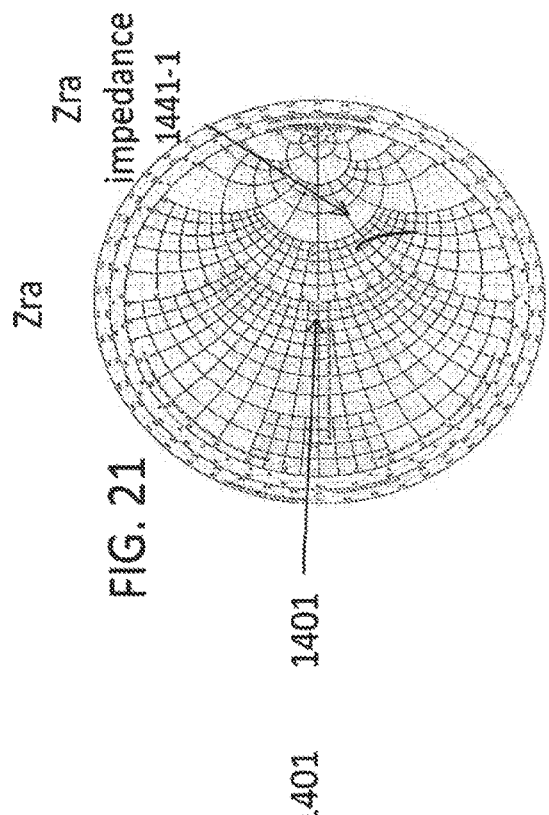
FIG. 19
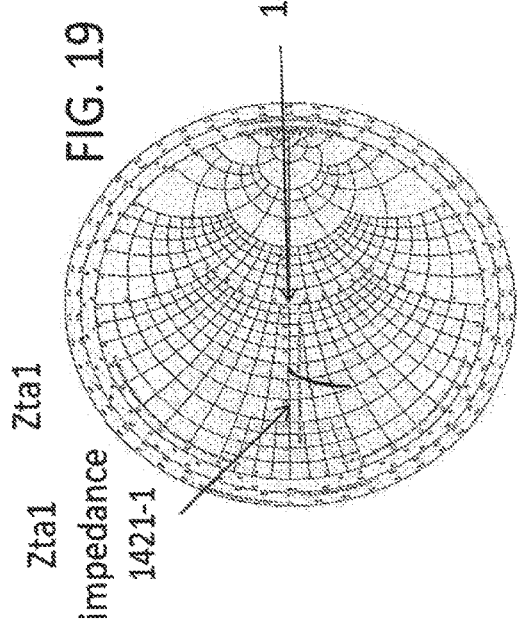
FIG. 21
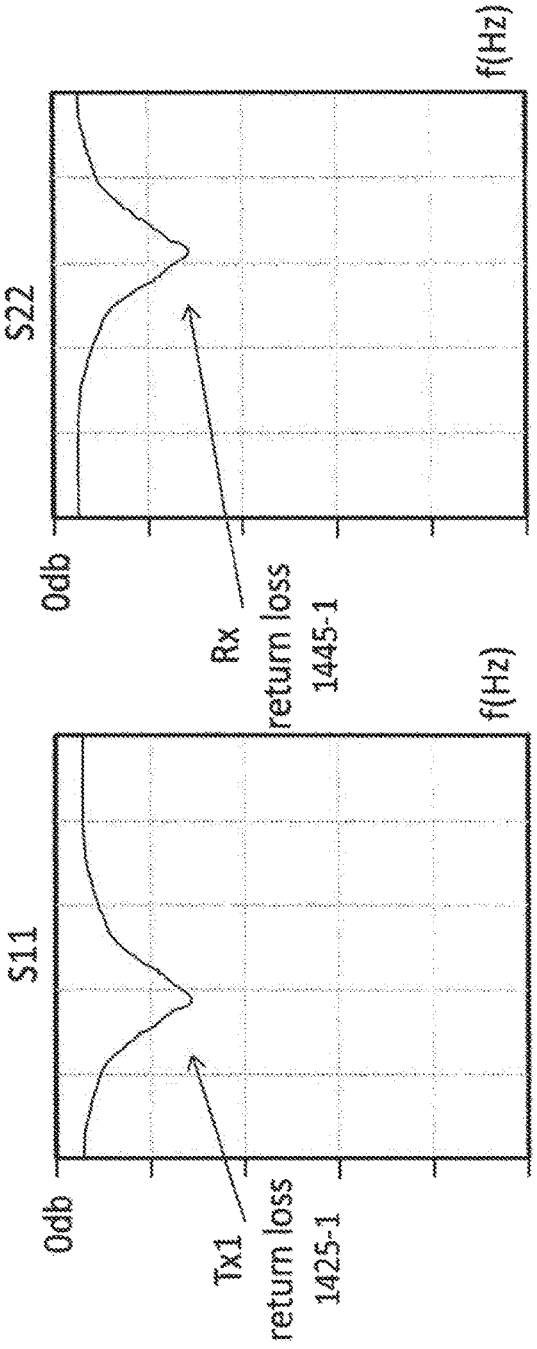
FIG. 20
FIG. 22

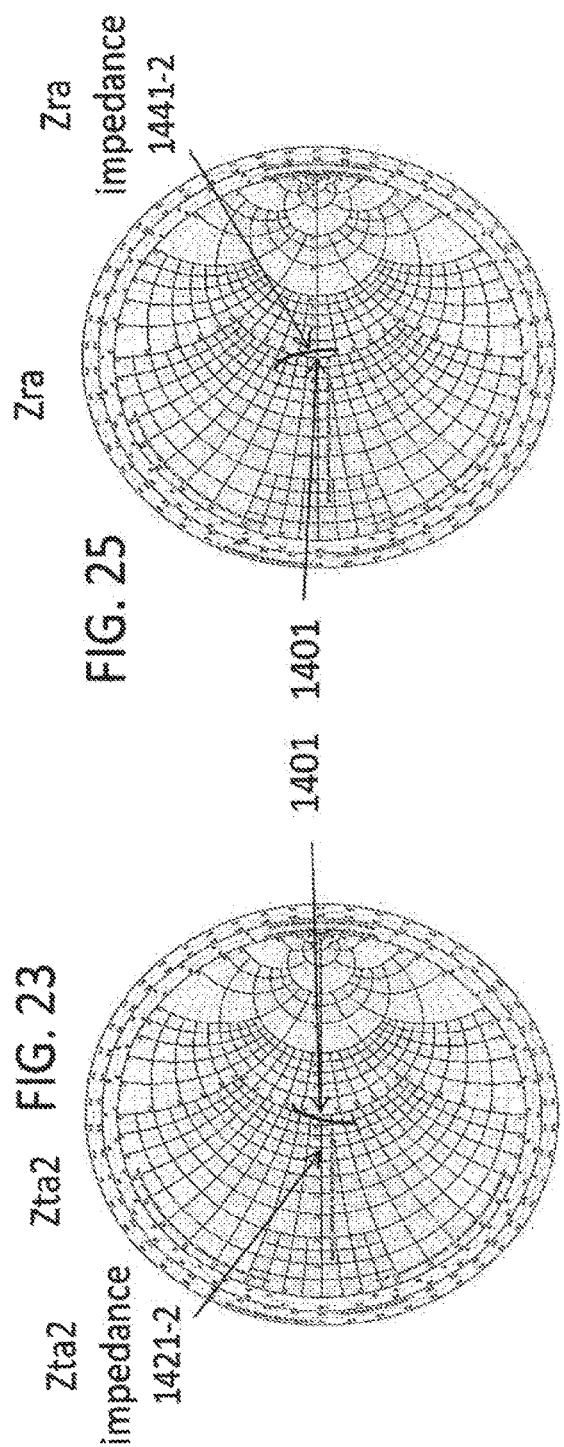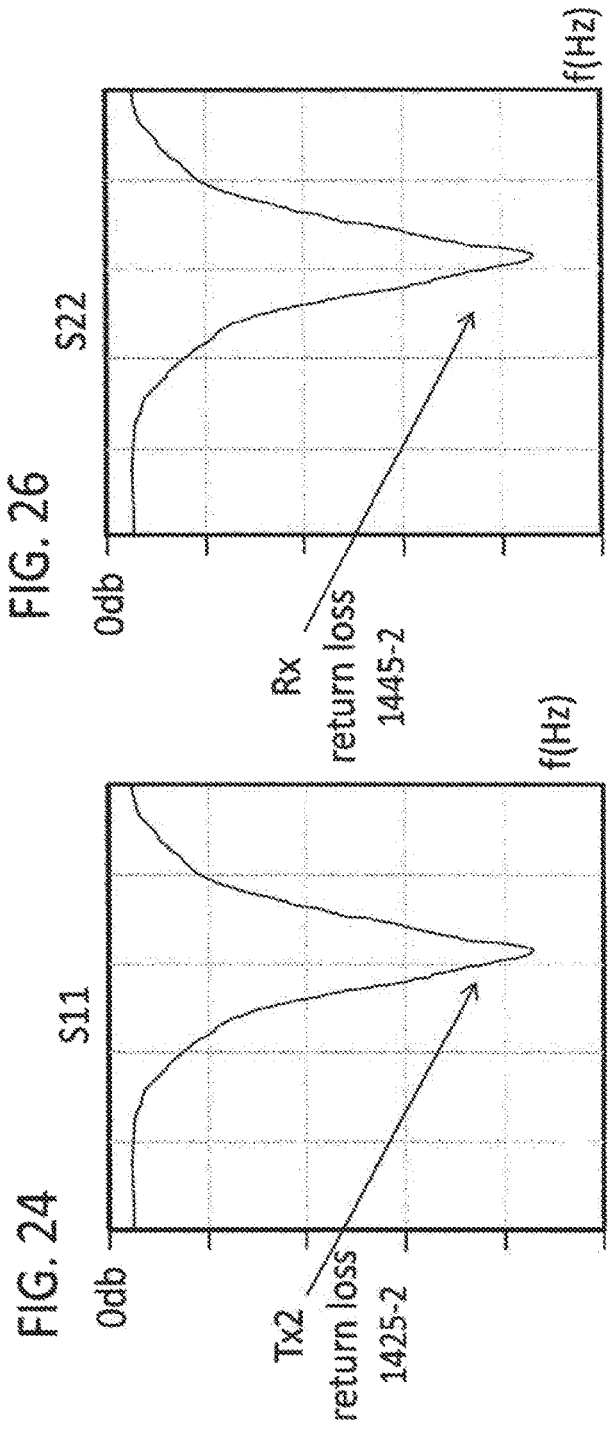

Tx1 is coupled to Rx not optimal matched system

Tx2 is coupled to Rx Optimal Matched system

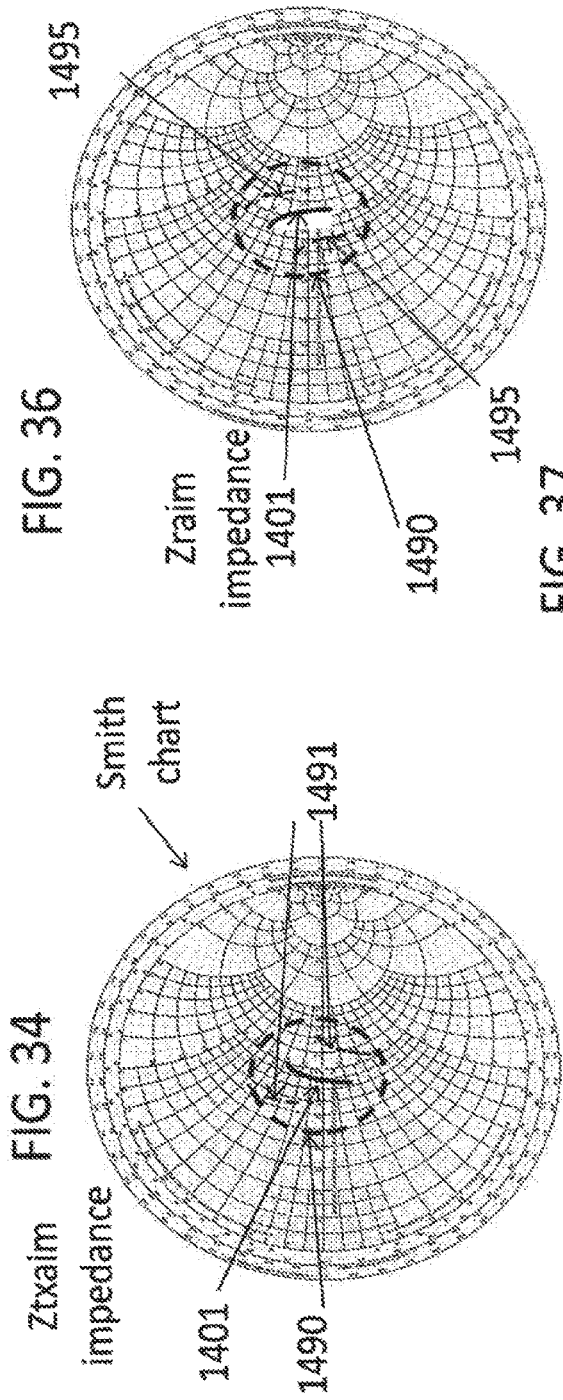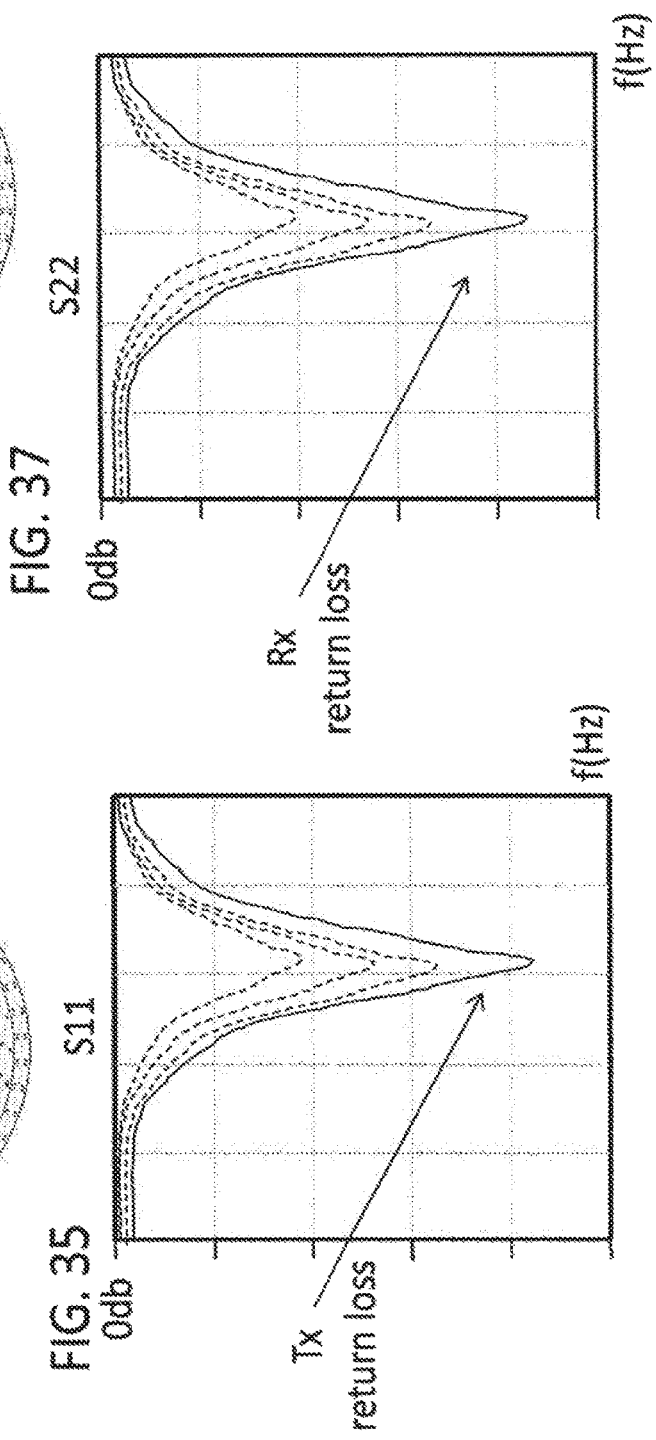

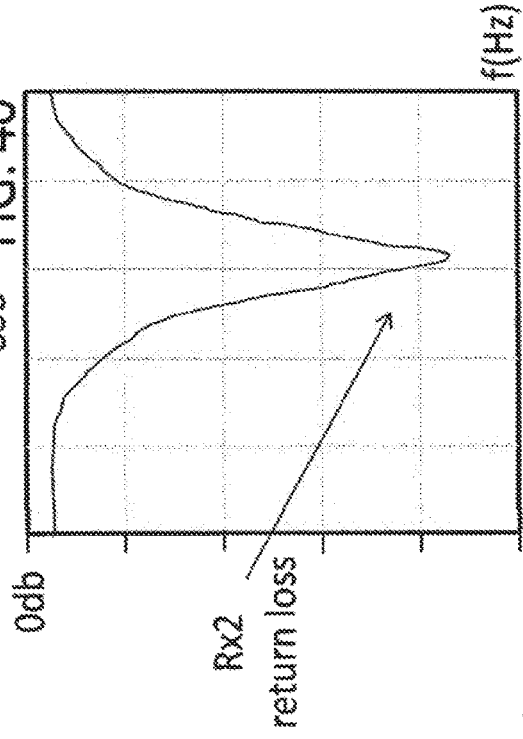
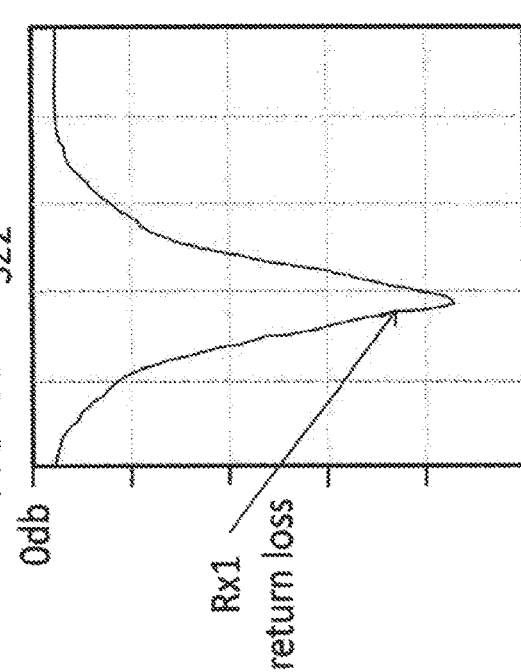
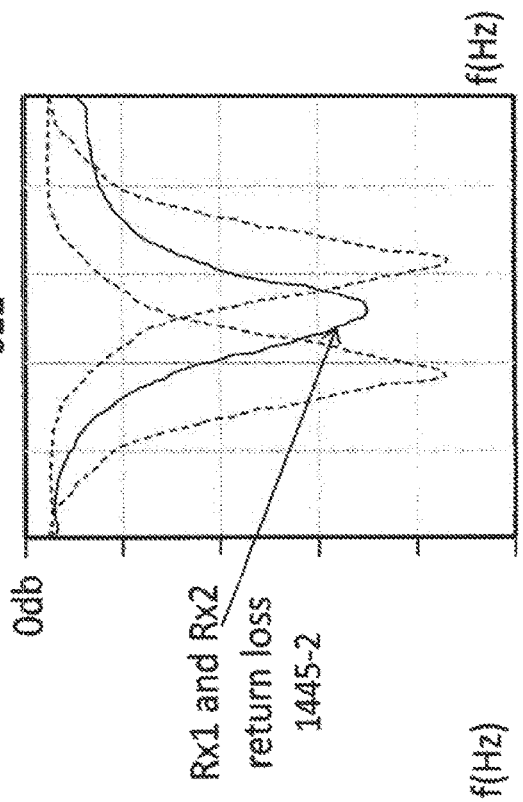
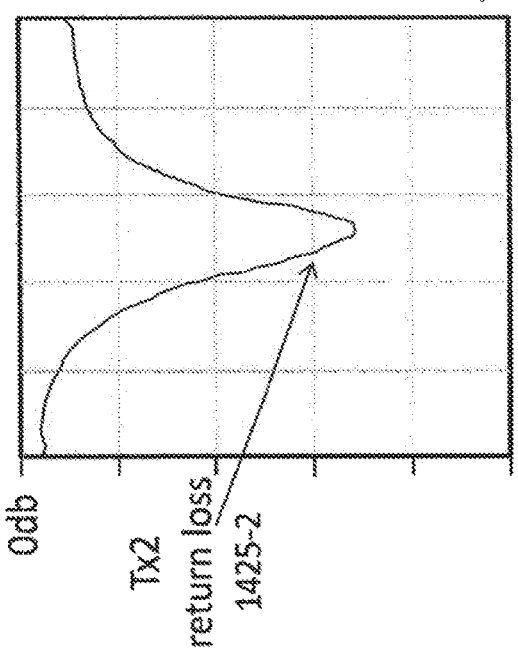

WIRELESS CHARGING DEVICE

CROSS-REFERENCE TO RELATED APPLICATION

The present application is a divisional application claiming priority to U.S. application Ser. No. 14/912,129 filed on Aug. 14, 2014 which has been allowed, which was a filing under 35 U.S.C. 371 from PCT/IL2014/050729 filed on Feb. 15, 2016, which claims priority to U.S. provisional patent application 61/866,337 filed 15 Aug. 2013, entitled "High Efficient Charging System Based On Electromagnetic Parameters Analysis And Method Of Use" and to U.S. provisional patent application 62/006,209 filed 1 Jun. 2014, entitled "Method And Apparatus For Efficient Delivery Of RF Energy In A Wireless Charging Device", the filing dates and full disclosures of which are incorporated herein by reference in their entirety.

TECHNICAL FIELD

This invention relates to a wireless charging of a device in general, and more particularly to efficiently delivering energy using a radio frequency signal from a transmitting device to a receiving device to be charged. It also relates to a receiver for use with the wireless charging device and to a wireless charging system comprising the wireless charging device and the receiver.

BACKGROUND

Wireless charging systems exploit propagation of energy by a radio frequency electromagnetic field between a transmitting unit and a receiving unit, which may be embedded in a chargeable device or may be coupled to such a device when it is required to charge it. The receiving unit has to cope with varying power levels in the electromagnetic field and with varying distances to the transmitting unit.

Commonly the impedance of the receiving unit is varied to compensate for changing power levels and/or changes in the impedance in the receiving antenna that may be caused by varying distances between the receiving and transmitting units. Another possibility is that the receiving device includes a charging management unit for controlling the charging current and voltage throughout the charging process.

SUMMARY

In accordance with one aspect of the invention, there is provided a wireless charging device comprising a transmitter coupled to at least one transmitting antenna and operable to cause the at least one transmitting antenna to emit electromagnetic radiation; a conductive structure adapted to confine the electromagnetic radiation to a charging zone; and a detector for detecting a degree of impedance mismatch between the transmitter and the at least one transmitting antenna.

By measuring the degree of impedance mismatch between the transmitter and the at least one transmitting antenna, the transmitter can detect impedance mismatches throughout an entire wireless charging system. This allows it to take account of variations occurring in a receiver, for example due to changes in the battery charge state without requiring any intelligence in the receiver itself. Thus, the receiver can, if desired, be entirely non-active.

By "confine", we mean that the electromagnetic radiation is not free to propagate beyond the charging zone as it would if propagating in free space. It does not necessarily mean that no electromagnetic radiation propagates beyond the charging zone, although that might be the case, for example, where the conductive structure is a Faraday cage.

In one embodiment, the conductive structure is a radiofrequency shielded structure within which the at least one transmitting antenna is located, the charging zone being located within an internal volume of the radiofrequency shielded structure.

The radio frequency shielded structure may have a removable portion to allow introduction of devices to be charged into the charging zone. The radiofrequency structure could be a Faraday cage. The charging zone may occupy the entire internal volume or only a portion of it. A device to be charged will usually be coupled to a receiver for receiving the electromagnetic radiation before being introduced into the internal volume of the radiofrequency shielded structure.

In another embodiment, the conductive structure defines a partially enclosed volume within which the at least one transmitting antenna is located and which has an open region allowing for introduction of a device to be charged into the partially enclosed volume, the charging volume occupying at least part of the partially enclosed volume.

The charging volume (also denoted hereinafter as: "charging zone") may be located entirely within the partially enclosed volume or it may extend beyond the partially enclosed volume, for example in the vicinity of the open region.

In yet another embodiment, the conductive structure is a planar structure on which the at least one transmitting antenna is located, whereby the charging zone occupies a volume surrounding the at least one transmitting antenna.

A device to be charged may be placed on the planar structure within the charging zone. The charging zone may be entirely over the planar structure. Alternatively, it might extend to the edge of the planar structure or beyond.

The charging zone preferably includes a region in which the electromagnetic radiation is concentrated relative to the remainder of the charging zone. We refer to this region as the maximal energy volume (MEV), which is described later in this document and in detail in our PCT application, published as WO 2013/179284, the contents of which are incorporated herein by reference.

The at least one antenna may comprise an array of antennae, each of which may be selected for emitting electromagnetic radiation to modify the charging zone.

Each antenna in the array may be coupled to a dedicated power amplifier in the transmitter. Alternatively, each antenna in the array may be switchably coupled to a single power amplifier. The modification of the charging zone may involve modifications to the location and/or the shape of the charging zone.

The at least one antenna may be an adaptive impedance transmitting antenna, the impedance of which is variable to modify the charging zone.

The modification of the charging zone may involve modifications to the location and/or the shape of the charging zone.

Modification of the charging zone as mentioned above affects the degree of coupling between the transmitting antenna and a receiver. Thus, the device can enhance the strength of the coupling between a transmitter and receiver without requiring exact placement of the receiver relative to the transmitting antenna and to take account of other factors such as changes in ambient temperature or the presence of a parasitic (i.e. non-chargeable) load in the charging zone.

The detector typically monitors incident power transmitted to the at least one transmitting antenna and reflected power received from the at least one transmitting antenna, the ratio of these indicating the impedance mismatch between the transmitter and the at least one transmitting antenna.

The ratio of reflected power to incident power is the same as the reflection coefficient S11. The ratio may be calculated by a controller or it may be derived by the detector itself, and may be referred to by the amplitude and/or the phase, or both.

The wireless charging device typically further comprises a controller coupled to the detector so as to receive a signal indicating the degree of impedance mismatch from the detector.

The controller may be adapted to respond to calculate a reflection coefficient S11 from the degree of impedance mismatch and to cause the device to indicate the absence of a device to be charged in the charging zone if the reflection coefficient S11 rises above a threshold value. As the impedance mismatch falls, the value of S11 rises and tends towards zero decibels. This is because it is the logarithm of the ratio of the reflected energy to the transmitted energy. As these two quantities become close, the value of S11 tends to zero decibels.

The controller may be adapted to respond to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range.

The threshold value is a predetermined value that may be part of the setting of the charging device. Alternatively, the threshold value may be set by the controller according to the condition of the charging session.

S11 parameter is described in the literature in various manners. In accordance with the present invention S11 is represented as a logarithmic ratio between the reflected power and the incident power. Accordingly, the threshold value is also represented as a logarithmic scale, and references that are made to values below or beyond the threshold are also refer to the same logarithmic scale. Therefore, the reflection coefficient S11 will usually be used as the measure of the degree of impedance mismatch.

The controller may be adapted to respond to the degree of impedance mismatch falling below the threshold value at at least some of the plurality of frequencies by causing the device to indicate the presence of a non-chargeable, parasitic load in the charging zone. Thus, the controller may be adapted to respond in this way to the degree of impedance mismatch falling below the threshold value at each of the plurality of frequencies.

The controller may be adapted to respond to the degree of impedance mismatch falling below the threshold at each of a set of the plurality of frequencies in a frequency region narrower than the frequency range by commencing a charging process. The frequency region defines a contiguous spread of frequencies within the frequency range.

In this case, the controller may be further adapted on commencement of the charging process to modify the power level at which the transmitter causes the at least one transmitting antenna to emit electromagnetic radiation whilst monitoring the degree of impedance mismatch to determine the power level at which the degree of impedance mismatch exhibits a peak and then setting the power level to that value.

Furthermore, the controller may be adapted during the charging process to monitor the degree of impedance mismatch and to respond to variations in the degree of impedance mismatch in at least one of the following ways: a) by varying the power level at which the transmitter causes the at least one transmitting antenna to emit electromagnetic radiation; b) by varying the frequency at which the transmitter causes the at least one transmitting antenna to emit electromagnetic radiation; c) by controlling an adaptive impedance matching unit coupled to the transmitter and the transmitting antenna to match the impedance of the transmitter and the transmitting antenna; and d) by coupling at least one antenna of an antenna array to the transmitter and/or by adapting the impedance of an adaptive impedance antenna.

By way of example, as charging of a battery connected to a receiver, which is coupled electromagnetically to the wireless charging device, proceeds, the impedance mismatch typically increases and the controller may respond to this by changing/modifying the power level and/or the adaptive impedance matching at which the transmitter causes the at least one transmitting antenna to emit electromagnetic radiation.

The controller may be adapted to respond to the degree of impedance mismatch falling below the threshold at each of two sets of the plurality of frequencies, each set being in a frequency region narrower than the frequency range by commencing a multiple device charging process.

In this case, the controller may be further adapted on commencement of the charging process to set the frequency and power level at which the transmitter causes the at least one transmitting antenna to emit electromagnetic radiation to a value between frequency values within each set at which the impedance mismatch exhibits a peak. In addition to the change of the frequency and power level, the controller may further adjust the adaptive impedance matching between the transmitter and the transmitting antenna, and/or may further adapt the impedance of an adaptive impedance antenna when such antenna is incorporated in the charging device.

The controller may be further adapted to respond to changes in impedance mismatch by adjusting the frequency and power level at which the transmitter causes the at least one transmitting antenna to emit electromagnetic radiation to a value closer to one of the two peaks than the other, and/or by adapting the impedance of an adaptive impedance antenna.

The controller may be further adapted to decrease the power level at which the transmitter causes the at least one transmitting antenna to emit electromagnetic radiation from a starting value for a predefined period of time before returning the power level to the starting value.

This enables measurement of the insertion loss S21 entirely from the wireless charging device without any interaction between this and the receiver, as will be explained in detail later.

In a second aspect of the invention, there is provided a wireless charging device for charging a chargeable unit, the device comprising a power transmitter coupled to a transmitting antenna for transmitting energy to the chargeable unit, a monitor for monitoring a reflection coefficient S11 of the transmitting antenna, and a controller adapted to respond to the monitored S11 value in at least one of the following ways: a) by varying the power level at which the power transmitter causes the transmitting antenna to transmit energy; b) by varying the frequency at which the power transmitter causes the transmitting antenna to transmit energy; c) by controlling an adaptive impedance matching unit coupled to the power transmitter and the transmitting antenna to match the impedance of the transmitter and the transmitting antenna; and d) by coupling at least one antenna of an antenna array to the power transmitter and/or by adapting the impedance of an adaptive impedance antenna coupled to the power transmitter.

In a third aspect of the invention, there is provided a receiver for use with a wireless charging device according to either of the first and second aspects, the receiver comprising a receiving antenna, a power conditioning circuit adapted to receive an electrical signal from the receiving antenna and condition the electrical signal into a form suitable for charging or powering a load, and a connector for coupling the power conditioning circuit to the load, in use.

Typically, the power conditioning circuit conditions the alternative (AC) electrical signal into a direct current (DC) suitable for charging a battery.

The power conditioning circuit may comprise an impedance matching circuit having only passive electrical components.

The receiver may further comprise a switch for interrupting the reception of the electrical output from the receiving antenna by the power conditioning circuit.

This is another way of enabling measurement of the insertion loss S21 entirely from the wireless charging device without any interaction between this and the receiver, as will be explained in detail later.

In a fourth aspect of the invention, there is provided a wireless charging system comprising a wireless charging device according to either of the first and second aspects and at least one receiver according to the third aspect.

The charging zone includes a region in which the electromagnetic radiation is concentrated relative to the remainder of the charging zone.

This region is the maximal energy volume mentioned above. It moves and/or changes shape (along with the charging zone), along with the location of the receiving unit within the charging zone, along with changes to the power level received by the receiver (it is according to the operation point of the power conditioning circuit in the receiver) and frequency at which the transmitter causes the at least one transmitting antenna to emit electromagnetic radiation and the degree of impedance mismatch between the transmitter and the transmitting antenna, and/or according to the adapted impedance of the adaptive impedance antenna during the charging process.

The controller in the wireless charging device may be further adapted to monitor the charging state of a battery in a chargeable unit coupled to the receiver by monitoring changes in the degree of impedance mismatch and to vary the power level and/or frequency at which the transmitter causes the at least one transmitting antenna and/or to adapt the adaptive impedance antenna, to emit electromagnetic radiation and/or to control an adaptive impedance matching unit coupled to the transmitter and the transmitting antenna to match the impedance of the transmitter and the transmitting antenna.

The controller in the wireless charging device may be further adapted to decrease the power level at which the transmitter causes the at least one transmitting antenna to emit electromagnetic radiation from a starting value for a predefined period of time before returning the power level to the starting value.

This enables measurement of the insertion loss S21 entirely from the wireless charging device without any interaction between this and the receiver, as will be explained in detail later.

The controller in the wireless charging device may be adapted to determine an insertion loss S21 value by calculating the ratio of the difference in the values of S11 during the predefined period and prior to the predefined period to the value of S11 prior to the predefined period. The difference in the values of S11 during the predefined period and prior to the predefined period provides an indication of the energy actually received by a device being charged and calculation of the ratio of this difference to the value of S11 prior to the predefined period results in an indication of the insertion loss S21.

The invention provides a charging unit that, by detecting the degree of impedance mismatch (typically by monitoring and analyzing the transmitted power and the reflected power), can control the frequency and/or power of energy transmitted to a receiver to ensure optimal coupling between the two, thereby ensuring efficient power transfer from the charging unit to the receiver.

To address these and potentially other issues with currently available solutions, one or more implementations of the current subject matter provide methods, systems, articles or manufacture, and the like that can, among other possible advantages, provide non-active and basic designs for the charging units and chargeable devices that eliminate the need for any active components within the receiving unit (CPU, controller, and such). The system and method can use of passive and basic receiving unit without the necessity to include active units or control units within the receiving unit. The advantages of implementations of the current subject matter can include improved energy transfer efficiency, reduced power consumption, and a reduction in size and complexity of the circuitry and design of the device to be charged, as well as the charging unit.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is a schematic diagram illustrating the components of a wireless charging system for wirelessly charging a device;

FIGS. 4B-1, 4B-2, 4C-1, and 4C-2 are schematic diagrams illustrating the influence that environmental factors in the surroundings can have on the size, shape and position of the charging zone and the maximal energy volume;

FIGS. 12-16 are Smith charts illustrating the antennas impedance and graphs illustrating the units return loss of the charging system setup of FIG. 2, in which the device under charge is located within the charging zone;

FIGS. 17A and 17B are graphs illustrating the energy transfer efficiency between the transmitting unit and receiving unit of the charging system of FIG. 3, in accordance with the two setups illustrated in FIGS. 1 and 2 respectively;

FIGS. 18 to 26 are Smith charts illustrating the antennas impedance and graphs illustrating the units return loss of the charging system setup of FIG. 5, illustrating a charging system having a transmitting antenna array with two transmitting sub units, when both units are located within the charging zone, and there is coupling and mutual influence between the transmitting antennas and the receiving antenna;

FIGS. 34-38 are schematic illustrations of the wireless charging system of FIG. 1 following adaptive impedance matching process that is performed after the electromagnetic parameters of the system are all set;

FIGS. 39 and 40 are graphs illustrating the return loss for two receivers, in multiple devices under charge scenario;

FIG. 41 is a graph illustrating the transmitting unit return loss.

FIG. 42 is a graph illustrating the common compliance point that is ideal to both receiving units on a return loss diagram.

When practical, similar reference numbers denote similar structures, features, or elements.

DETAILED DESCRIPTION

The subject matter described herein relates to a system and method for wirelessly charging a device. Radio frequency energy can be delivered wirelessly to provide power to a device. Electromagnetic energy can be transmitted from a charging unit, received at a device being charged, and converted into direct current (DC) voltage suitable for charging a battery on the device. There is a need to improve the power transfer efficiency in wireless charging systems in order to minimize energy loss during the energy transfer and the charging process. This can be implemented by controlling and adapting the energy transfer process from a unit performing the charging to a device being wirelessly charged.

Power transfer efficiency can be improved using adaptive impedance matching circuits that can be used to adjust the impedance at an antenna of the device receiving the electromagnetic energy to a variety of input power levels. Adaptive impedance matching requires active procedures in order to keep the charging unit in its optimal operation point in order to maintain the highest RF to DC conversion efficiency.

There is a call in the industry to minimize the complexity of devices and components used in wireless charging, as well as to minimize the power consumption of receiving circuitry in devices to be charged.

Following is a description, by way of example only and with reference to the accompanying figure which are a diagrammatic representation, of one method of carrying the current subject matter into effect.

Figure 4A:
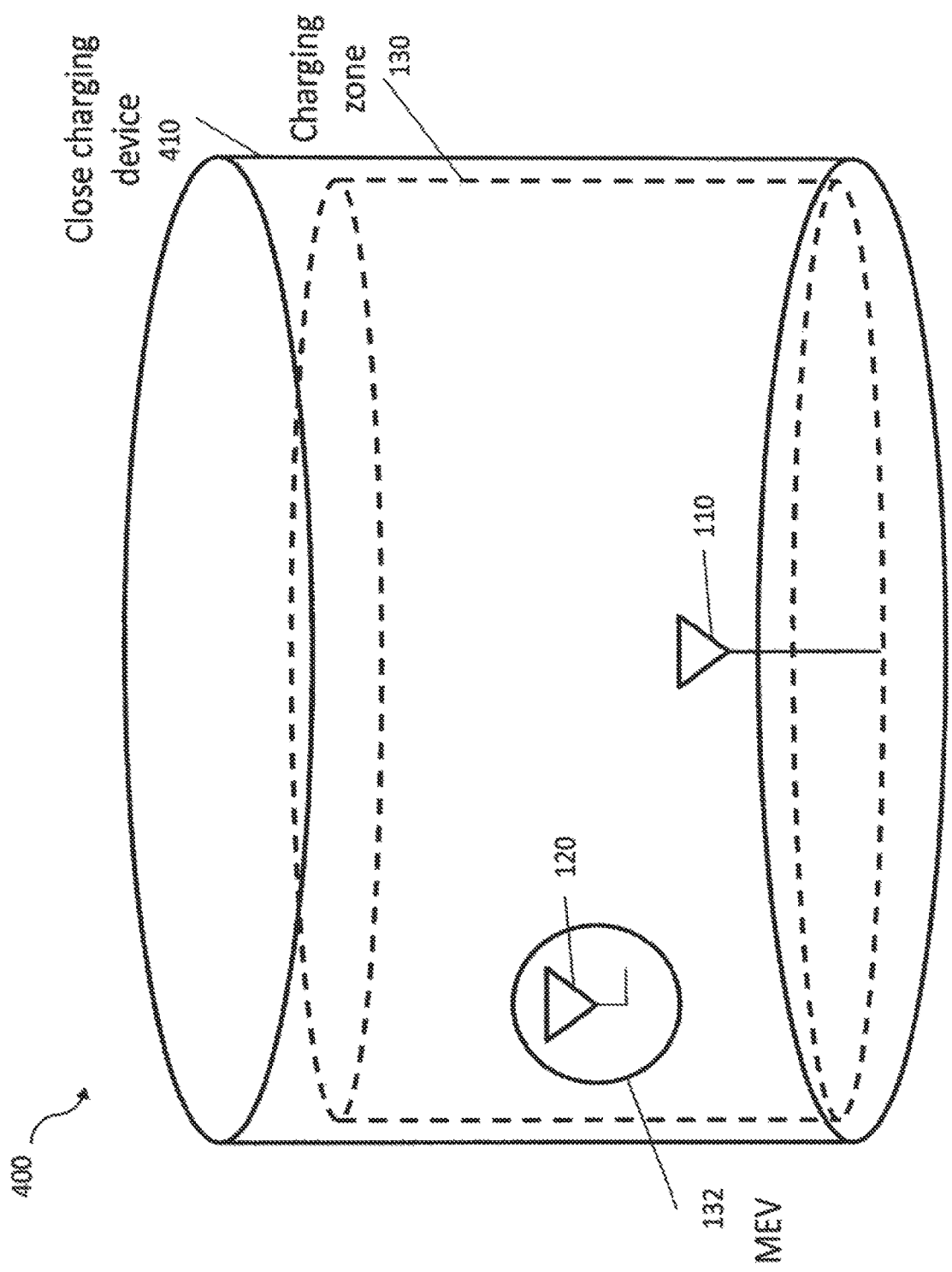
FIG. 4A is a schematic diagram illustrating a closed conductive wireless charging device implementation of FIG. 3.
Figures 1, 4B:
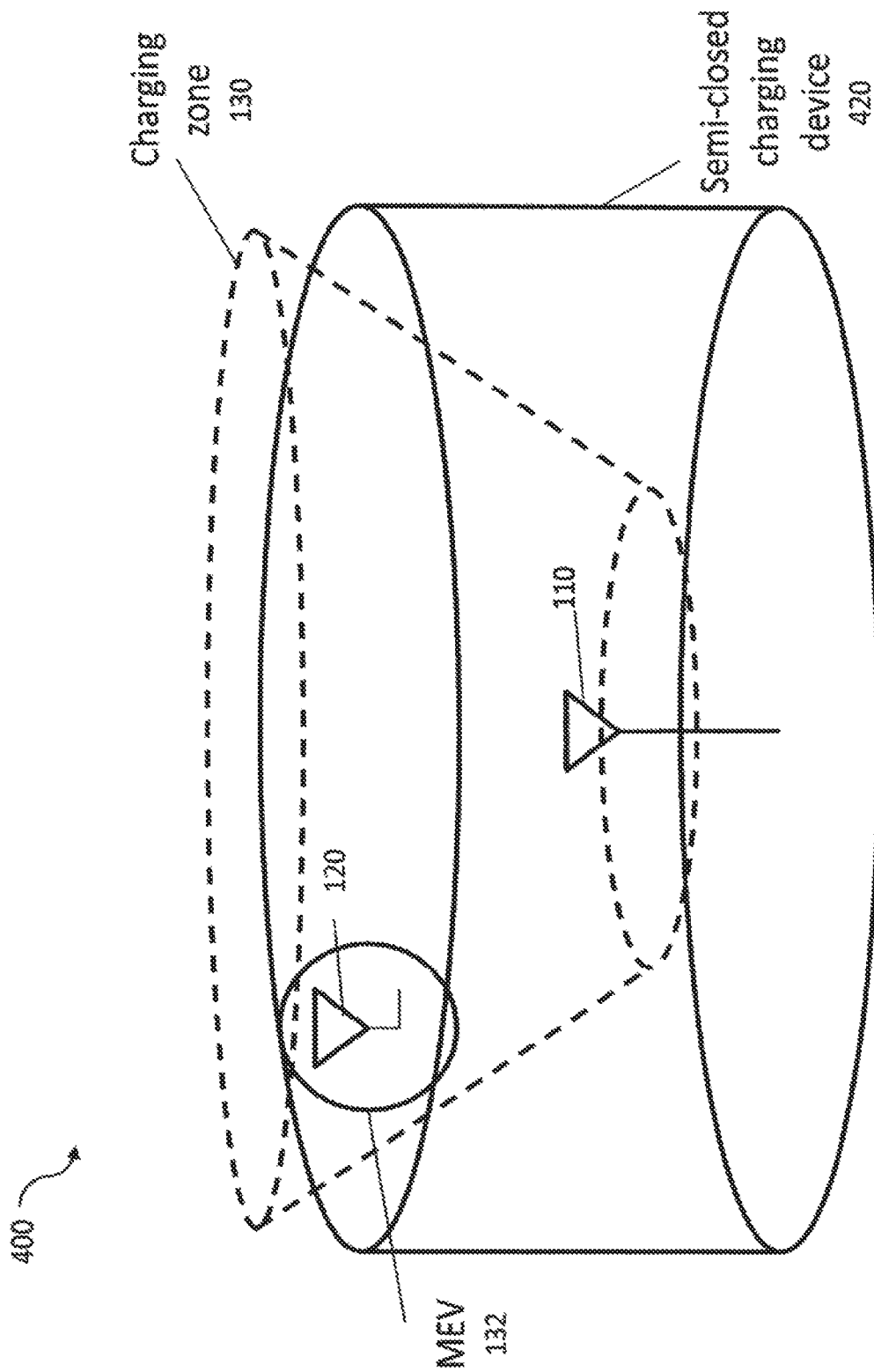
Figures 2, 4B:
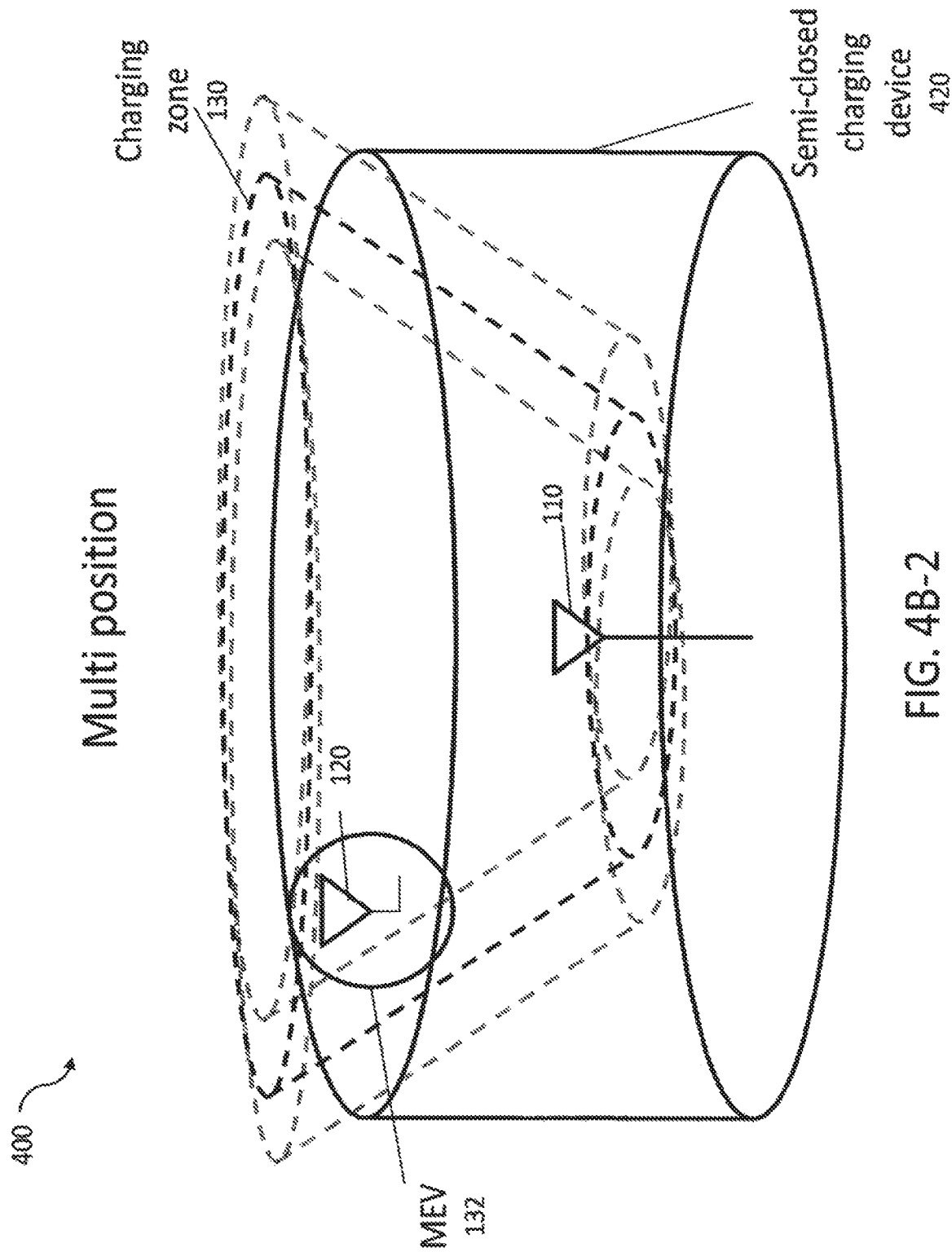

FIG. 1 is a schematic diagram illustrating the components of a wireless charging system 100 for wirelessly charging a device. System 100 can include at least a transmitting unit 101 and at least one receiving unit 102.

The transmitting unit 101 can be a charging device used to wirelessly charge another device. Alternatively, the transmitting unit 101 can be a component of a charging device. The transmitting unit 101 can include at least a transmitting antenna 110 and a transmitting sub-unit 112. The transmitting sub-unit 112 can be configured and operable to generate Radio Frequency (RF) signals at various different frequencies within a frequency range, and to transfer the RF signals to the transmitting antenna 110. The transmitting antenna 110 can then transmit the RF signals to a receiving antenna 120, physically residing within a charging zone.

The receiving unit 102 is a device that is chargeable. Alternatively, the receiving unit 102 can be a component of or coupled to a device that can be charged (device under charge "DUC") 300. The receiving unit 102 can include at least a receiving antenna 120 and a receiving sub-unit 122. Receiving unit 102 can be functionally connected to an optional secondary cell or battery 124. The receiving unit 102 and the secondary cell 124 are preferably located within a device under charge (DUC) 300. In alternative implementations, the receiving unit 102 and the secondary cell 124 can be located outside a device under charge 300, and can be physically connected by cables, or connectors and such, to the device under charge 300. The receiving sub-unit 122 can be configured and operable to receive RF signals from the receiving antenna 120 and can convert it into DC power.

The term "receiving unit" refers to the unit and circuits that are configured and operable to receive electromagnetic energy transmitted from a transmitting unit, and to convert the received energy into a DC voltage suitable for charging a secondary cell and/or operating an electronic device.

In FIG. 1 the device 300, as well as the battery 124, is shown positioned outside of the charging zone 130 of the wireless charging system 100. In this setup the device 300 that contains the receiving unit 102 is located outside the charging zone 130 that can be defined mainly with respect to transmitting antenna 110. In this scenario, there is no coupling between the transmitting antenna 110 and the receiving antenna 120, and there is no interaction between the antennas. As a result, there may be no functional charging taking place.

Figure 2:
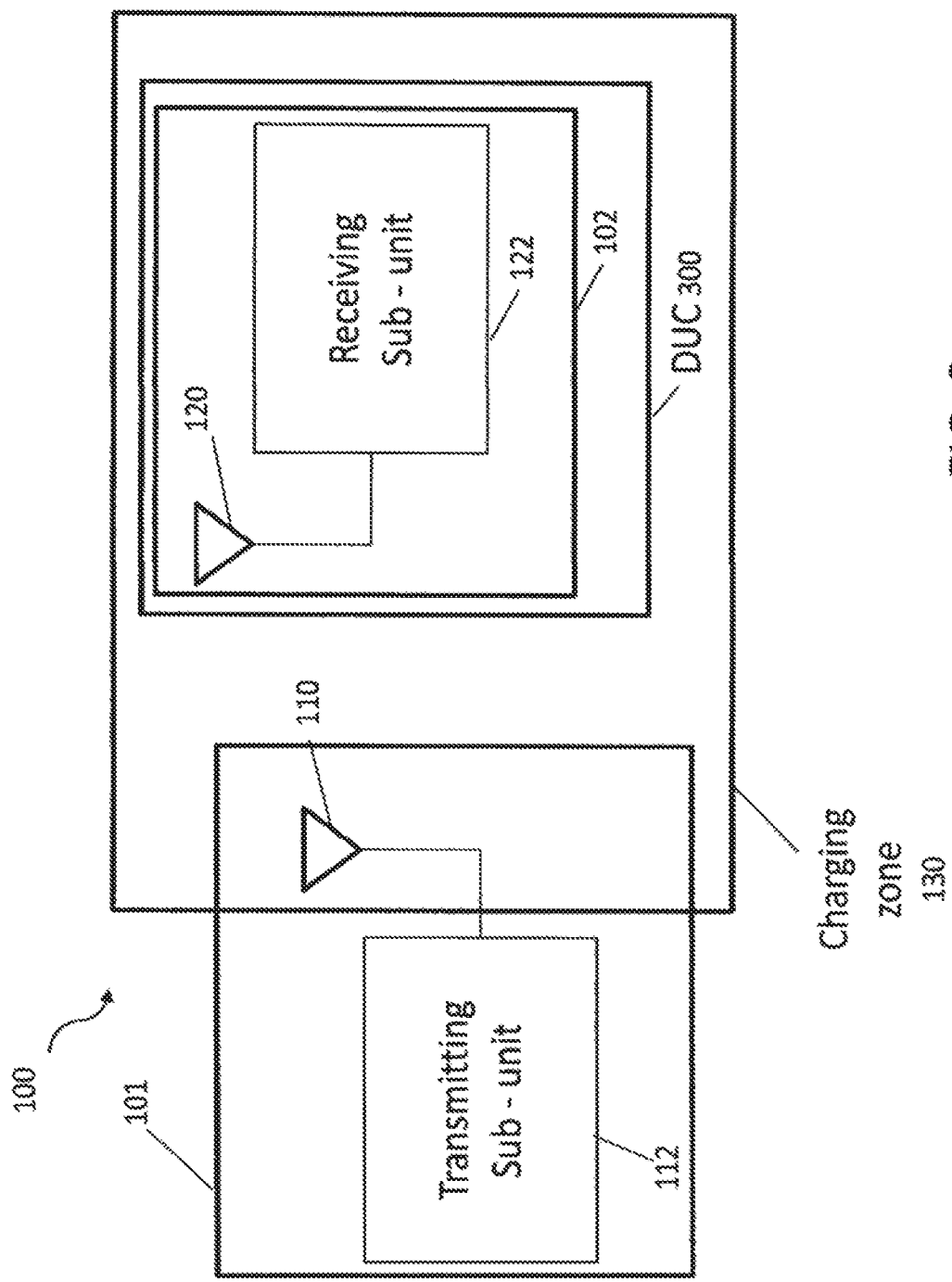
FIG. 2 is a schematic diagram illustrating the wireless charging system of FIG. 1, with the device under charge or battery, positioned within the charging zone.

FIG. 2 is a schematic diagram illustrating part of the wireless charging system of FIG. 1, with the device under charge 300 (or battery) positioned within the charging zone 130. In this scenario, there is coupling and mutual influence between the transmitting antenna 110 and the receiving antenna 120. In this manner, radio frequency energy from the charging unit can be transmitted to the receiving unit with capabilities of monitoring, adjusting, and controlling the energy transfer and the charging process of a battery that is connected to the receiving unit in a near field and/or a coupling region. As long as the transmitting unit 101 in the charging unit, and the receiving unit 102 attached to/comprised within the device under charge are implemented using a compatible wireless charging protocol, the receiving unit can be charged without a need for connecting compatible connectors and interfaces for charging. Instead, the non-active receiving unit need only be placed within the wireless charging zone 130.

The receiving unit 102 can be implemented such that the need for active/adaptive/programmed elements can be eliminated in the receiving unit 102 of a device to be charged. The energy transfer from the transmitting unit 101 to the receiving unit 102, and the charging process of the secondary cell by the receiving unit can be controlled and managed entirely by adapting the transmitting profile to the entire system condition and requirement.

The energy transfer process from the transmitting unit 101 to the receiving unit 102 in a wireless charging system can be controlled and adapted for monitoring the entire charging process of the secondary cell by the receiving unit via a control unit that is functionally positioned in the transmitting unit, preferably within a wireless charging device.

Energy transfer efficiency can be improved by maintaining in real time, maximal power transferring efficiency between the transmitting unit and the receiving unit for any given situation and during the charging process. Thus, the charging process can be updated in real time.

Power consumption can be reduced by eliminating active units in the receiving unit required for operation of power circuits. When there is a presence of active units, the receiver may consume more power than the amount of power that is required for charging the battery. Therefore, non-active receiving components can allow the power consumption to be substantially reduced. Furthermore, the power consumption can be reduced because the charging process is not necessarily performed using a constant amount of power. Rather, the charging can adjust and follow the battery charging profile and condition in real time, and the power provided is the exact amount of power required at a specific point in time. This leads to energy saving as no excess power is wasted.

In order to fit into many smaller devices, the receiving unit 102 needs to be as small as possible. For example, small enough to fit on a hearing aid that can fit into a person's ear. Since active components require a controller/CPU for management, it is difficult to design and implement active components in a small circuit or small chip. Therefore, using passive receiving components can reduce circuit and chip size requirements.

Figure 3:
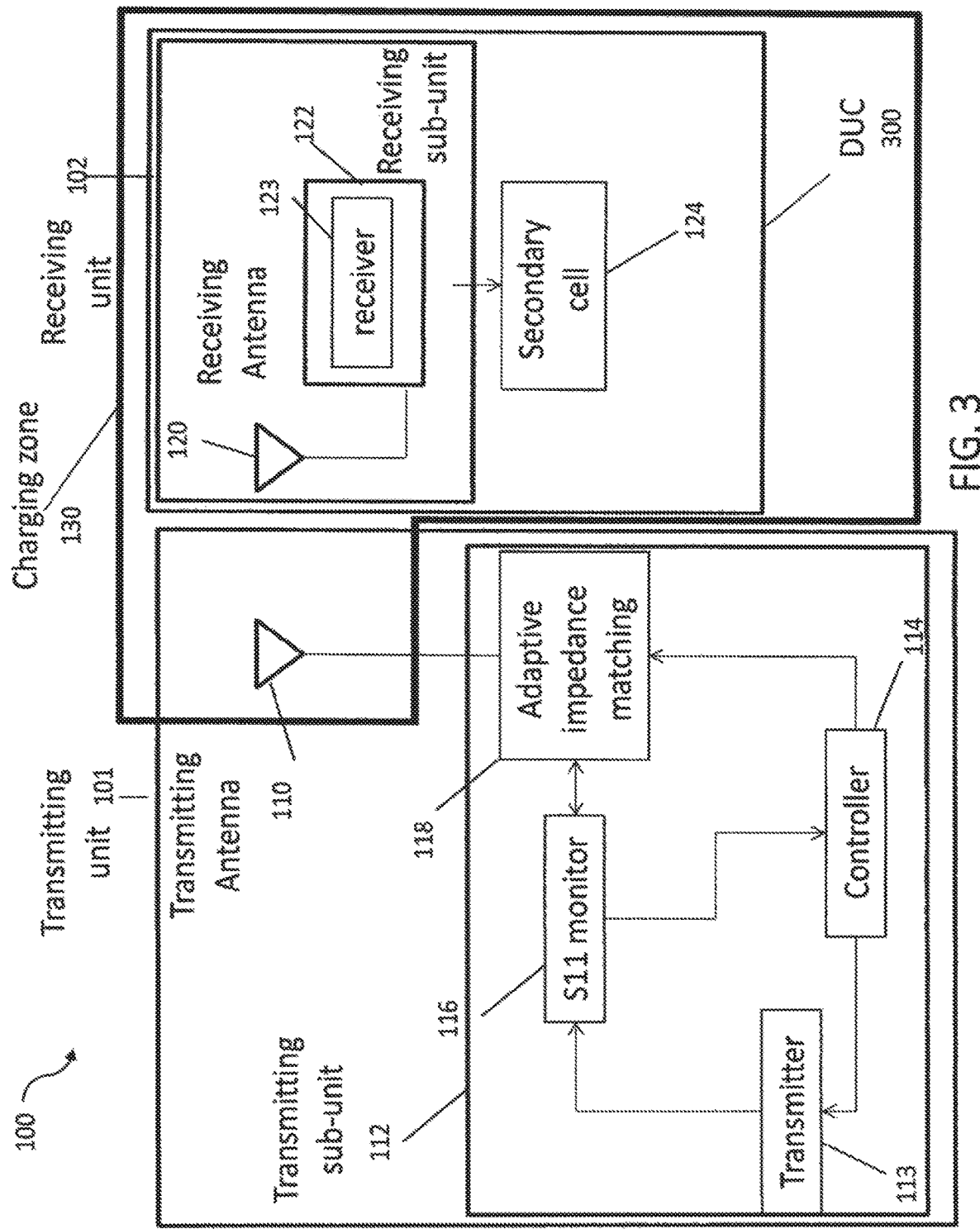
FIG. 3 is a schematic diagram illustrating the wireless charging system of FIG. 1, with detailed component descriptions.

FIG. 3 is a schematic diagram illustrating the wireless charging system of FIG. 1, with detailed component descriptions. The transmitting sub-unit 112 of the transmitting unit 101 can include at least a transmitter 113, a controller 114, reflection coefficient/return loss (S11) monitor (such as bi-directional coupler) 116, and an AIM (Adaptive Impedance Matching) unit 118. The S11 monitor 116 can be operably connected to the transmitter 113, and can receive signals and data from the transmitter 113. The S11 monitor can also be operably connected to the AIM unit 118 can receive and send signals and data to and from the AIM unit 118. The S11 monitor can then use the signals and data that it receives to measure and monitor the transmitter return loss S11 from the transmitter 113 and/or from the transmitting antenna 110. The S11 monitor 116 can also be operably connected to the controller 114. The controller 114 and AIM unit 118 can in turn be operably connected to each other, thereby creating a feedback loop between the S11 monitor 116, the controller 114 and the AIM unit 118, whereby the S11 monitor 116, the AIM unit 118 and controller 114 can adapt the impedance, and hence the S11 return loss of the transmitter 113. It is understood that the transmitter 113, the S11 monitor 116, the controller 114 and the AIM unit 118 can be implemented on one computing device including a processor and programmable instructions. Alternatively the noted components may be implements on a number of connected computing devices each including a processor and programmable instructions.

In more detail, the transmitting sub-unit 112 comprises a transmitter 113 that is coupled via a S11 monitor 116 (a bi-directional coupler) and adaptive impedance matching unit 118 to transmitting antenna 110. A controller 114 (such as a suitably configured microcontroller or field programmable gate array) receives signals indicating the value of S11 from the S11 monitor 116 and controls the frequency and power of the signal issued by transmitter 113 to transmitting antenna 110 and adaptive impedance matching unit 118 accordingly.

The controller 114 may also select different or additional transmitting antenna elements for transmitting the signal from transmitter 113 when the transmitting antenna 110 is an array of antennas. Similarly, the impedance of the antenna 110 may be varied when this is an adaptive impedance antenna. In either case, this leads to a control over the shape and size of the charging zone.

By monitoring the value of S11 and its variations with frequency and/or power, the controller 114 can determine if a device in the charging zone is a parasitic load or a genuine device capable of being charged, i.e. a receiving unit 102.

The receiving unit 102 receives electromagnetic energy transmitted from transmitting unit 101 (when it is in the charging zone) and converts it to a form suitable for charging the secondary cell 124 in the receiver 123. The receiver 123 comprises a power conditioning circuit, which carries out this function. Typically, the power conditioning circuit comprises a passive circuit for matching the impedance of the receiving antenna 120 to that of charging circuitry for charging the secondary cell 124. The charging circuitry typically comprises active circuitry, such as a rectifier diode, for rectifying the alternating current signal received from the antenna 120 and converting it into a direct current suitable for charging the secondary cell 124.

The receiving sub-unit 122 of the receiving unit 102 can include at least a receiver 123. The receiving sub-unit 122 can be connected to receiving antenna 120. Receiving unit 102 can be functionally connected to the secondary cell/battery 124. Also shown in this figure is the charging zone 130, within which the receiving antenna should reside in order to enable the charging of the device under charge 300.

The components that can be included in the design of transmitting unit 101 can have respective impedances. For example, the transmitting antenna 110 can have impedance denoted by "Zta", and the transmitter 113 can have impedance denoted by "Ztran". The transmitting unit 101 can have total impedance denoted by "Ztx". As a result of the mismatches between the impedances of different components that can be part of the transmitting unit 101, as well as other factors, the transmitting unit 101 can have a return loss, denoted by "S11", when transmitting a signal out from the transmitting unit 101. In other words "S11" can denote the entire return loss of the transmitting unit 101 when transmitting a signal or power.

Similarly, the components that can be included in the design of receiving unit 102 can have respective impedances. For example, the receiving antenna 120 can have impedance denoted by "Zra", and the receiver 123 (including battery 124) can have an impedance denoted by "Zrecv". The receiving unit 102 can have a total impedance denoted by "Zrx". As a result of the mismatches between the impedances of different components that can be part of the receiving unit 102, as well as other factors, the receiving unit 102 can have a return loss, denoted by "S22", when receiving a signal. In other words "S22" can denote the entire return loss of the receiving unit 102 when receiving a signal or power.

It is important to note that the charging device does not actually make a measurement of S22; it works by measurement of S11 alone. To measure S22 would require additional functionality in the receiving unit 102 and communication between the transmitting unit 101 and receiving unit 102. When there is no receiving unit 102 in the charging zone, the entire transmitted energy from the transmitter 113 is reflected. However, when a receiving unit 102 is present in the charging zone, it receives energy from the transmitter 113 and the amount of reflected energy reduces significantly. This is detectable from S11 alone using the S11 monitor 116 in transmitting sub-unit 112. It is therefore not necessary to measure S22, although its behavior can be inferred (as indicated in this specification) from measurement of S11.

In addition to the internal transmitting unit 101 loss (S11), and the internal receiver unit 102 loss (S22), there can be additional losses due to mismatched impedances between the transmitting unit 101 total impedance (Ztx) and receiver unit 102 total impedance (Zrx), when a signal is sent from the transmitting unit 101 to the receiver unit 102. These insertion losses affect the transfer efficiency of signals between the transmitting and receiving units, as can be denoted as "S21" and "S12", respectively.

At the beginning of the charging process the transmitting unit 101 can be configured to a certain specific frequency and matched to a frequency of the receiving unit 102. At this operating state the return loss S11 and S22 values can be small as the return waves reflecting from the transmitting signals are minor. Accordingly, the values of the transfer efficiencies S21 and S12 are high as the transmitted signals are fully or almost fully transferred and received by the receiving antenna 120. During the charging process as the secondary cell 124 accumulates charge and obtains resistance, the impedance of the receiver 123 can change, and consequently the total impedance of the receiving unit 102 (Zrx) also changes, and the value of the receiving unit loss S22 changes accordingly. Since in system 100 the receiver unit 102 and the transmitting unit 101 operate very close to each other, the change in the value of receiving unit loss S22 affects the values of transmission efficiencies S21 and S12, as well as the value of the transmitting unit loss S11. As a result, the system 100 can become impedance unmatched, which can result in the bouncing back of transmitted signals, the loss increases, and there is a reduction in efficiency of the charging process.

The total impedance of the receiving unit 102 (Zrt) can be affected by many factors. Such factors can include any state change of the charging load (secondary cell 124), or any offset of the receiving unit 102 from an operational or electrical change (for example: current, voltage, or impedance) or mechanical change (for example: temperature, other physical objects positioned in the proximity of the receiving antenna that may cause changes in the antenna impedance (Zra) by virtue of their presence). Thus, any change that occurs in the total impedance of the receiving unit (Zrt) can lead to changes in the receiving unit's return loss (S22).

Furthermore, a change to the receiving unit 102 return loss (S22) can change the coupling coefficient for transfer efficiency (S21) between the antennas and the entire units. The altered coupling coefficient (S21') can be reflected to the transmitting unit 101 and can consequently change the return loss (S11') and the impedance of the transmitting unit 101 (Ztx'). Thus, the change of the impedance of the transmitting unit (Ztx') due to a changed transmitting unit return loss (S11') can cause impedance mismatch between the transmitter impedance (Ztran) and the transmitting antenna (Zta).

In order to obviate this mismatched impedance state, and to keep the system 100 in a matched, high transfer efficient status, a method can be implemented in accordance with the current subject matter, to monitor and control the charging process of the secondary cell 124, by decoding the behavioral electromagnetic connection between the transmitting unit 101, and the receiving unit 102. This may be achieved by the controller of the transmitting unit 101 monitoring the transmitting unit return loss (S11 and S11') that leads to impedance mismatch between the transmitter impedance (Ztran) and the transmitting antenna impedance (Zta). The controller can monitor the loss of the secondary cell 124, the receiver 123, the receiving antenna 120, and the entire state of the receiving unit 102.

The values of S11 measured by the S11 monitor 116 during the charging process, can be delivered to the controller 114 that upon detection of a change in the value of this parameter can control the adaptive impedance matching (AIM) unit 118 to match the impedance of the transmitting unit 101 such that the values of S11 and S22 will decrease. As a result, the coupling coefficient can be returned to a high transfer efficiency (S21/S12) state. The controller 114 is further connected to the transmitter 113 and can be configured to control the transmitting profile according to the state of the detected charging process and the specific needs of the secondary cell 124 and its charging profile.

Therefore, based on the information obtained, the controller 114 can track and make the necessary changes in the impedance matching network between the transmitter 113 impedance (Ztrans') and the transmitting antenna 110 impedance (Zta'). In this way the receiving unit 102 can be supplied with the required amount of power to charge the secondary cell 124 according to its new condition/requirement, and the highest transfer efficiency coefficient (S21) can be achieved between the transmitting and the receiving units and antennas (maintain the strong coupling coefficient).

FIG. 4A is a schematic diagram illustrating a closed conductive wireless charging device implementation of FIG. 3. The system 400 includes a closed charging device 410, which includes the transmitting unit 101 (not shown) of FIG. 3 with transmitting antenna 110. A charging zone 130 is shown as a cylindrical volume. A maximum energy volume (MEV) 132 is shown, which is the optimal charging volume. The charging zone is the area or volume in which charging may occur (i.e. coupling between the transmitting antenna 110 and the receiving antenna 120). In a closed charging device 410, the dimensions and geometry of the device 410 can determine the charging zone 130, based on the transmission frequency. Within the charging zone 130, a maximal energy volume (MEV) 132 can develop, which is a volume where the maximal energy can be concentrated from the total energy transmitted by the transmitting antenna. Therefore, while charging may occur in the charging zone 130, the maximal energy volume (MEV) 132 is the functional area in which the charging can physically occur. The MEV 132 is also affected by the type of antennas in use i.e. their impedance and the distance between the antennas, and the charging frequency.

The charging process can be performed in the closed wireless charging device 410 as described in WO 2013/179284 of the same inventor, incorporated herein by reference. In accordance with other aspects of the invention the charging can be conducted in a semi closed wireless charging device or on an open charging board as shown in FIGS. 4B-1, 4B-2, 4C-1, and 4C-2. These figures are schematic diagrams illustrating the influence that environmental factors in the surroundings can have on the size, shape and position of the charging zone 130 and the maximal energy volume MEV 132, for the same transmitting antenna 110 and receiving antenna 120 setup. FIGS. 4B-1 and 4B-2 illustrate an semi-closed charging device 420, with FIG. 4B-2 illustrating charging zone 130 positions. FIGS. 4C-1 and 4C-2 illustrate a charging board 440, with FIG. 4C-2 illustrating multiple charging zone 130 positions. In a closed charging device the dimensions of the charging zone are limited by the size of the wireless charging device relative to the semi-closed charging device and the open charging board. FIGS. 4B-2 and 4C-2 illustrates how the charging zone 130 can be moved and/or changed in volume under the influence of adjustments made by controller 114 to accommodate different locations of a device to be charged within the charging zone 130.

In the closed electromagnetic conductive charging device 410, three basic considerations can be taken into account: the inner cavity design of the closed charging device (i.e. size and geometry) should be suitable for the transmitting frequency, the closed charging device 410 should have dimensions suitable to fit the secondary cell or the device under charge 300, and the dimensions of the inner cavity of the closed charging device 410 should be suitable to accommodate the charging zone 130.

Another parameter that can be considered concerns the characteristics of the transmitting antenna 110 and the receiving antenna 120. These antenna characteristics can include being able to operate with the frequency chosen for delivering the RF energy from the transmitting unit 101 to the receiving unit 102, and being able to operate within the charging zone 130, such that the antennas can have a mutual influence on each other within the charging zone.

According to another implementation of the current subject matter, the transmitting unit 101 can recognize at least one device to be charged within the charging zone 130. Therefore, the system and methods of the current subject matter can recognize whether a charging device 410 is empty, or if a device to be charged is present within the charging zone 130.

When the transmitting unit 101 and the receiving unit 102 are not adjacent to each other the transmitter 113 may not cause RF energy to be transmitted, and the receiver 123 may not receive RF energy, and both of the return loss parameters S11 and S22 values may be 0 db.

When the transmitter 113 is connected to a transmitting antenna 110, a charging zone 130 can be defined by the volume within which a possible connection between the transmitting unit 101 and the receiver 102 may be established. This potential volume depends on the "effective distance" between the transmitting antenna 110 and the receiving antenna 120. By "effective distance" as used herein is meant the maximum distance between the transmitting antenna 110 and the receiving antenna 120, in which the presence of the receiving antenna 120 can electromagnetically influence the transmitting antenna 110, and vice versa. The effective distance is the outer boundary defining the charging zone 130. The charging zone of the antennas may also be affected by the surroundings of the antennas, where the same antennas in different environments may yield different charging zones. For example, different environments can include a closed metallic box, a semi closed metallic box, and open charging box, as shown in FIGS. 4A-C respectively. This mutual influence between the transmitting antenna 110 and the receiving antenna 120 can be used to identify different conditions in the surroundings.

In a closed charging device 410, including a transmitting unit 101, but having no device under charge 300 (DUC) or another object therewithin (i.e. no receiving unit 102), the impedance (Zta) of the transmitting antenna 110 is unmatched. The transmitting antenna 110 impedance (Zta) will be very low, and the transmitting unit return loss S11 therefore tends to zero.

$$S11 = 0 \text{ dB } (RL \text{ (db)} = 10 \log Pb\,Pf)$$

where Pf is the forward power transmitted, and Pb is the back power reflected back to the transmitting unit 101. (i.e. the transmitting antenna 110 may not be coupled to any consumer and therefore may be unmatched to the transmitting unit 101). Thus, all the incident power (forward) that should be transmitted is reflected (backward) to the transmitting unit 101. In this scenario, the device under charge (DUC) 300 is positioned outside the charging device 410. Therefore, the receiving antenna 120 is not coupled to any transmitting antenna 110 and therefore, the impedance of the receiving antenna (Zra) is unmatched. The receiving antenna impedance Zra will be very high;

$$S22 = 0 \text{ dB } (RL \text{ (db)} = 10 \log Pb\,Pf)$$

When the transmitting unit return loss S11 value is zero, the controller 114 of the transmitting unit 101 interprets this situation as the absence of a device to be charged in the vicinity. Furthermore, when the controller 114 determines that the value of the transmitting unit return loss S11 equals zero, the controller can conclude that the device to be charged 300 is outside of the charging zone 130 (S22=0 db).

Upon placing the device under charge (DUC) 300, or a battery connected to a receiving unit 102, into the closed charging device 410, the transmission of RF energy from the transmitting unit 101 to the receiving unit 102 becomes possible. The transmitting antenna 110 and the receiving antenna 120 can have mutual influence on each other, and their impedances Zta and Zra can change. Coupling between the antennas can be established and can lead to matching conditions between the transmitting unit 101 and the receiving unit 102 that can enable maximal energy transfer between the units in the following manner.

Once coupling between the transmitting antenna 110 and the receiving antenna 120 occurs due to a mutual influence between the antennas, the impedance of each antenna can change. The transmitting antenna 110 impedance Zta and the receiving antenna 120 impedance Zra may not be reflected as an open/short circuit, but rather as impedance that can lead to the creation of matching conditions between the antennas.

This matching condition between the transmitting antenna 110 and the receiving antenna 120 can decrease the insertion loss:

$$(IL \text{ (db)} = 10 \log Pr\,Pt)$$

of the energy path. Therefore, the ratio between the output power that is received in the receiving antenna terminal and the input power that is being delivered to the transmitting antenna terminal (Pr/Pt), can increase such that the S21 value (db) can become less negative (→0 db).

The new transmitting antenna impedance condition Zta can lead to a matching condition between the transmitting antenna 110 and the transmitting sub-unit 112. This matching condition can decrease the return loss S11 of the entire transmitting unit 101. Therefore the ratio between the reflected power (backward) to the incident power (forward) (Pb/Pf) can decrease due to a reduction in the amount of power that is being reflected. The transmitting unit 101 return loss S11 value (db) can become more negative (<<0 db) and more energy can be transferred from the transmitting unit 101 to the transmitting antenna 110.

The new receiving antenna impedance Zra can lead to a matching condition between the receiving antenna 120 and the receiving sub-unit 122 only when the power conditioning circuit met its operation point. This matching condition can decrease the return loss of the entire receiving unit 102. Therefore, the ratio between the reflected received power (backward) to the incident received power (forward) can decrease due to a reduction in the power that is reflected. Therefore, the S22 (db) value becomes more negative (<<0 db) and more energy can be transferred from the receiving antenna to the receiving sub-unit.

Upon insertion of a receiving unit 102 into a charging device 410, 420, or 440, that contains the transmitting unit 101, the coupling between the two units may initially be poor. In this scenario it may not be possible to deliver energy efficiently between the two units. Upon establishing mutual influence between the two units under control by controller 114 of the transmitter 113 (for example, the power and/or frequency of transmission) and/or selection of different or additional antennae in an array of antennae and/or adjusting the impedance of the antenna and/or matching the impedance of the transmitter 113 and antenna by way of the adaptive impedance matching unit 118, the efficient transfer of energy can be allowed.

According to another implementation of the current subject matter, the transmitting unit 101 can distinguish between a chargeable device and a non-chargeable device. The transmitting unit 101 can recognize the presence of a chargeable device 300 comprising the receiving unit 102, and can distinguish between such a chargeable device and other devices that are not competent for charging according to the system and methods of the current subject matter.

When a device to be charged 300 is positioned in the charging zone 130, both parameters S11 and S22 have frequency profiles as illustrated in FIGS. 14 and 16 respectively. Each profile correspond to the response from the receiving unit and the transmitting unit, respectively. As shown in the figures, S11 as well as S22 have a peak at the operating frequency, which is typically in the range of 2.4 to 2.4835 GHz, but in different embodiments a wider or narrower range could be used, potentially centered on a different frequency.

In a scenario that a non-chargeable device is positioned in the charging zone, the S11 profiles may also have a peak value, either in the transmitting frequency or in other frequencies. Alternatively, if the object is absorbing the energy transmitted, the profile may be constant and not frequency dependent. The transmitting unit 101 may perform an identification process by performing a sweep by transmitting signals over a spectrum of frequencies. Specifically, the controller 114 of the transmitting unit 101 is adapted to respond to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range. This is performed in order to identify if a device contains a chargeable receiving unit 102 based on the obtained signal being within a range that is defined to correspond to the transmitting unit 101.

Figure 9:
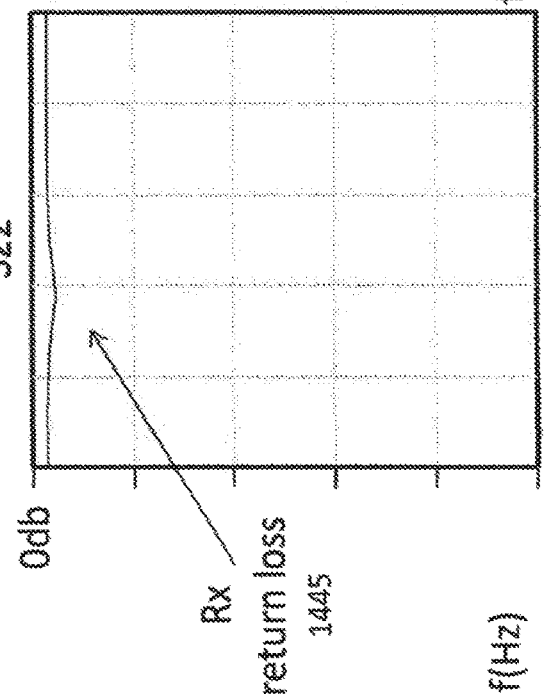

Thus, it is possible to distinguish a chargeable device from a non-chargeable device by monitoring the S11 parameter. When the charging zone 130 is empty, the S11 parameter is as shown in FIG. 9. When a device to be charged is placed in the charging zone 130, S11 changes. If the device placed in the charging zone 130 is non-chargeable device there could be two possible scenarios. The first is that S11 will have the same or substantially the same value over the entire frequency range. In this case the device acts the same at all frequencies in the entire frequency range and receives power regardless of the frequency and the transmitted power level. To determine this, the controller 114 causes the transmitter 113 to conduct a frequency sweep to see if S11 changes with frequency and to increase the power level of transmitter 113 in order to see if S11 changes according to the changes of the power level. Since the receiving unit 102 contains a rectifier unit, whose impedance depends on the received power level, changes to the transmitted power level that cause the rectifier unit to begin conducting reduce S22 and as a result S11 is also reduced. However, if the value of S11 is invariant with frequency and power, the controller 114 can determine that the device in the charging zone is non-chargeable and merely a parasitic load.

The second scenario is that the measurement of S11 shows a response that indicates that the device in the charging zone is chargeable (FIG. 14) (i.e. the value of S11 is not invariant with frequency and/or power). In this case, the controller 114 causes transmitter 113 to apply a power sweep at the frequency that gave the best S11 results. If the device is chargeable, the rectifier in the conduction of the receiving unit 102 will depend on the received power level and hence the value of S22 will vary with the power level. This can be detected by the controller 114 as a variation in S11, which confirms that the device in the charging zone is chargeable.

If the signal obtained is within the defined range that is suitable to the profile of the receiving unit 102, there is an additional step in the identification process. This step can be based on two parameters.

The first parameter is the compliance range of S11. In order to discover the compliance range of S11, the controller 114 can check where the peak event is located (i.e. what is the frequency range of the peak).

The controller 114 in the transmitting unit 101 is adapted to respond to a reflection coefficient S11 from the degree of impedance mismatch and to cause the charging device to indicate the absence of a device to be charged in the charging zone if the reflection coefficient S11 rises above a defined threshold value. As has been explained previously, the value of S11 tends to zero as more of the transmitted energy is reflected (which occurs when there is no device to be charged in the charging zone) because S11 is the ratio of the reflected and the transmitted energy expressed in decibels.

When comparing S11 to threshold values, the controller 114 operates in one of two ways. Initially, the value of S11 is compared to a predefine threshold in order to detect a peak in the S11 frequency profile. In this case, the controller 114 causes the transmitter 113 to sweeping over the operating frequency band (typically 2.4 GHz to 2.4835 GHz) and if it receives a S11 reading that is below the predefined threshold. There can be several different predefined threshold levels that can be used for comparison with S11 values by the controller 114 in order to increase the accuracy of detection of a peak.

After the initial comparison has been made and a peak detected, the controller 114 causes the transmitter 113 to sweep over the operating frequency band and compare the current S11 value to a previous value. In this case the system is searching for changes in the S11 value in order to detect a peak in the S11 frequency profile.

Thus, the comparison of S11 values against thresholds can be used to determine if a device to be charged is present in the charging zone and furthermore to detect (and allow adaptation to) the correct conditions for the charging process in terms of frequency and/or power of transmission from transmitting antenna 110, impedance matching between the transmitter 113 and transmitting antenna 110 (using the adaptive impedance matching unit 118) and control of antenna impedance and/or selection of antennas in an antenna array.

The threshold can be adapted in real time according to initial conditions by continuing comparison of S11 values to previous values.

The second parameter is the duration of the compliance relative to the frequency, which is determined in the following manner. If the S11 parameter is disturbed during the entire compliance range it means that there is a constant absorbance of energy with no dependence on the transmission frequency. Specifically, the controller 114 of the transmitting unit 101 is adapted to respond to the degree of impedance mismatch falling below the threshold value for the S11 return loss at each of the plurality of frequencies thus causing the device to indicate the presence of a non-chargeable, parasitic load in the charging zone. Such a behavior may be suitable for a mass of plastic and/or metal and is unrelated to charging.

Furthermore, the controller 114 is adapted to respond to the degree of impedance mismatch falling below the threshold at each of a set of the plurality of frequencies in a frequency region narrower than the frequency range by commencing the charging process.

Since the system is configured to operate at a certain power, the receiving antenna 120 has an optimal operating point. Therefore, there is a specific frequency at which the receiving unit 102 is configured to receive more RF energy than at other frequencies. In other words, the system is frequency dependent, and thus, only at a certain frequency will the system be at an optimal operation point. When the receiving antenna 120 enters into the charging zone 130, a change in the S11 parameter occurs and as a response, the transmitting unit 101 can elevate the transmission power that leads to an improvement in the S11 value. This occurs as a result of the activation of the power conditioning circuit that results in improving the transmission efficiency. (As a result, the value of S22 parameter is also improved.) The difference between the forward power and the reflected power at this point will be maximal. The change in S11 and S22 depending on the power value is possible only if the object to be charged that is inserted into the charging zone comprises a valid receiving unit 102 of the current subject matter. In all other non-chargeable objects the value of S11 will remain unchanged.

According to another implementation of the current subject matter, the system 100 can monitor the energy delivery between the transmitting unit 101 and the receiving unit 102. This can be performed by monitoring and analyzing the S11 value, where the lower the value of S11, the greater the amount of energy delivered and the efficiency of energy transfer. The S11 parameter can be used in accordance with the proposed subject manner, to measure the charging efficiency. Thus, there is a need to make sure that the transmitted RF energy reaches the receiving unit and is not absorbed by another unit (parasitic load) in the charging zone. This is because the S11 parameter provides an indication of the amount of power that is received by the entire system (including the device under charge) relative to the total transmitted power (the power received by the system is the power that is not reflect back to the transmitter Preceive=Ptotal−Preflect). The current subject matter can provide two exemplifying configurations and methods that can allow monitoring the energy that is functionally received by the receiving unit 102.

In the first configuration, S11 is monitored by changing the power in the transmitting unit solely by the controller, which causes a diode or other rectifying unit in the receiving unit 102 to reach its operating point (when the receiving unit 102 can efficiently convert received RF energy to DC for charging a battery). In this configuration, after the receiving unit 102 has reached its operating point with the impedance of the system matched, the controller can be configured to serve as a switching unit such that the controller can instruct the transmitting unit to decrease the transmission power drastically. This ensures that the diode is out of its operating point (S22=0 db), for a pre-determined period of time. In this configuration, the measured value of S11 provides an indication of the total loss of the system (the loss occurs by uptake of the charging device (loss occurs) that arises as a result of components of the device under charge (DUC) other than the receiving unit that is functionally disconnected). The value obtained can be compared with the S11 value obtained in maximal transmission power and the difference between the two values provides a measure of the actual amount of energy received by the receiving unit.

In the second configuration, S11 value is monitored by switching off the receiving antenna using a power management integrated circuit (PMIC) or a controller in the receiving unit. In this configuration, once the receiving unit has reached the optimal working mode (the diode reached the operation point) and the impedance of the system is matched, the PMIC or another controller in the receiving unit is operated to switch off the receiving antenna. The new S11' value obtained at this time point can reflect the total loss of the system (the loss occurs due to the uptake of the charging device and by components of the device under charge (DUC) other than the receiving unit that is functionally disconnected). The S11' value obtained can be compared with the S11 value obtained in maximal transmission power and the difference between the two values provides the actual amount of energy received by the receiving unit.

In accordance with the current subject matter, the dimensions of the charging device, whether it is a closed conductive box, a semi-closed box, or an open charging board, are predetermined and thus can be considered to be constant parameters. Consequently, the impedance of the antennas is determined mainly based on the distance between the transmitting and the receiving antennas that can have an effect on their mutual influence and impedance. This can be in addition to surrounding factors such as metals and dielectric bodies within the surroundings that can have an electromagnetic influence on antenna impedance. As such, the presence of the conductive and dielectric components inside the charging zone can have an influence on the antenna impedance and the coupling coefficients S12 and S21 between the antennas. The conductive and dielectric components' influences can also be considered as constants. Any changes that occur in the impedance of the antennas can influence the total impedance of the transmitting unit 101 and the receiving unit 102. These changes can be interpreted by the controller of the transmitting unit 101 as constant conditions and provided to the adaptive impedance matching unit of the transmitting sub-unit 112. Adaptive impedance matching unit 118 takes into account the constant conditions that it receives when adapting and matching the impedance of the transmitting unit 101 to the receiving unit 102. When the transmitting unit 101 and the receiving unit 102 are optimally matched, the maximum energy volume (MEV) created is surrounding the receiving unit 102 locates within the device under charge (DUC) 300, and the device under charge 300 is most efficiently charged in this position.

Thus, the most influential parameters that determine the efficiency of the charging can be the coupling coefficients S12 and S21 between the transmitting antenna 110 of the charging device and the receiving antenna 120 of the device under charge 300.

In order to obtain maximal energy transfer (charging efficiency), three interactions may be taken into account: the interaction between the impedance of the transmitting sub-unit and the impedance of the transmitting antenna ZtrZta, the interaction between the receiving antenna and the rectifying unit ZraZrec, and the interaction between the impedance of the transmitting unit 101 and the receiving unit 102 ZtxZrx.

The ability to adapt the charging system in order to obtain optimal energy transfer and charging can be implemented by the ability to change the coupling coefficients S21 and S12 between the transmitting antenna and the receiving antenna using a mutual influence effect. In accordance with embodiments of the subject matter, this may be achieved using various methods, for example using an antenna array or by using an adjustable impedance antenna. It is understood that other methods that can modifying the coupling between the two antennas are also within the scope of the current subject matter as described in more detail below.

Figure 5:
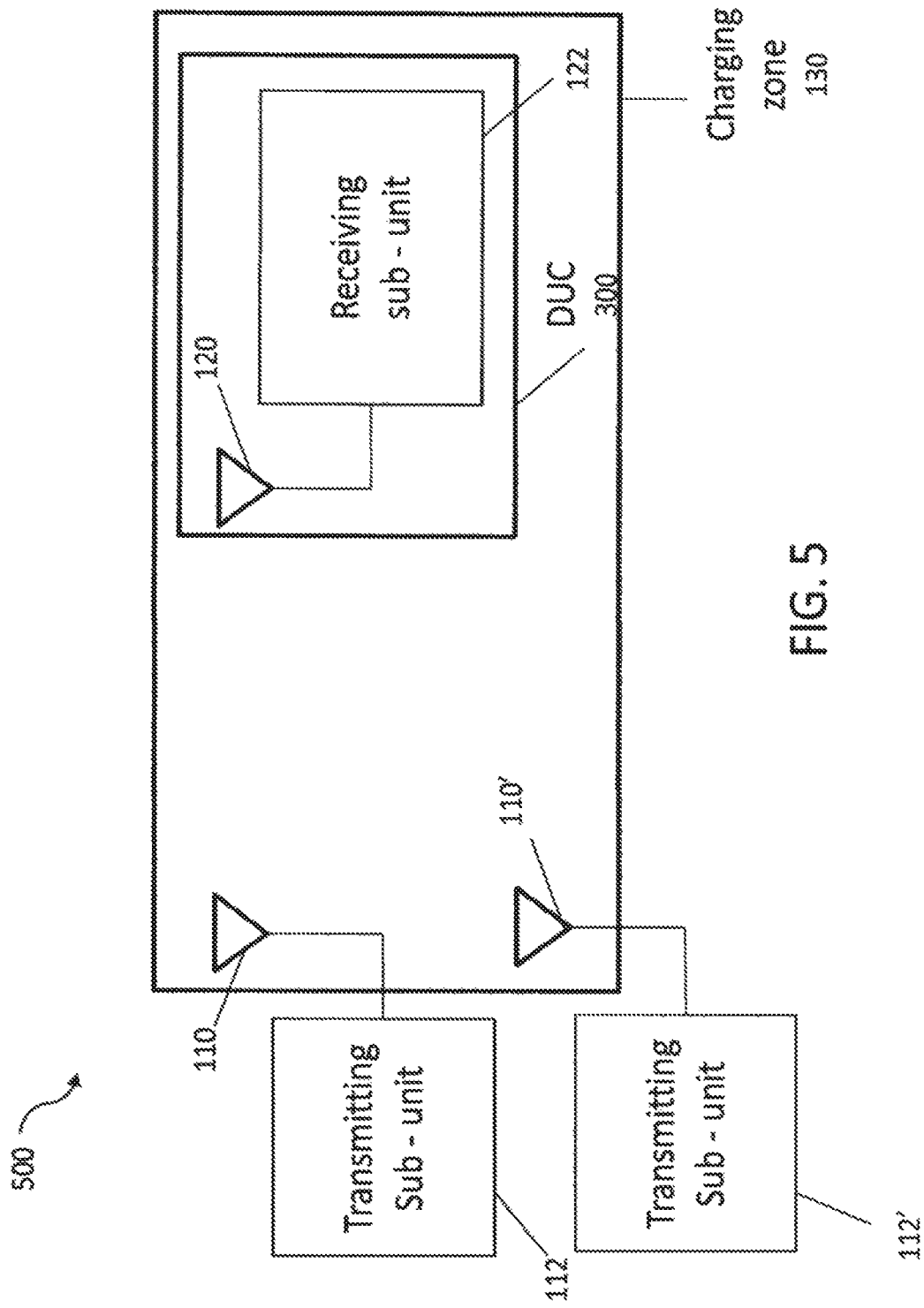
FIG. 5 is a schematic diagram illustrating a charging system comprising a transmitting unit having two transmitting sub-units and two transmitting antennas.

FIG. 5 is a schematic diagram illustrating a charging system 500 comprising a transmitting unit having two transmitting sub-units 112 and 112'. Each of the transmitting sub-units can be configured to generate and transfer RF signals to the transmitting antennas 110 and 110', which are connected to transmitting sub-units 112 and 112', respectively. The charging zone 130 can be defined respectively corresponding to the transmitting antenna 110 and transmitting antenna 110'. The charging system 500 further includes a receiving unit 102 (not shown), including a receiving sub-unit 122, located within the device under charge (DUC) 300. The device under charge DUC 300 is placed within the charging zone 130. There can be a coupling and mutual influence between the transmitting antenna 110 and the receiving antenna 120, as well as between the transmitting antenna 110' and the receiving antenna 120.

In a configuration where the transmitting unit can comprise an antenna array (in this example the transmitting antennas 110 and 110'), each antenna within the array can have a different impedance (Z) value with reference to the receiving unit, since the distance of each antenna in the array is different or due to different characteristic of the antennas. Upon an insertion of a device under charge (DUC) 300 into a closed, semi-closed, or open charging device, the charging system can measure the respective S11 return loss impedance of each antenna in the array. The antenna that provides the lowest S11 value (after tuning the frequency, the power level and the impedance by the Adaptive Impedance Matching (AIM) unit 118) can be selected to transmit the RF energy.

| Antenna (A) | Zta | Zra | S11 |
|---|---|---|---|
| A1 | Zta1 | Zra1 | S11(1) |
| A2 | Zta2 | Zra2 | S11(2) |
| ● | ● | ● | ● |
| ● | ● | ● | ● |
| ● | ● | ● | ● |
| An | Zta_n | Zra_n | S11(n) |

(It is be noted that Zta influence Ztx, and Zra influence Zrx).

Figure 6:
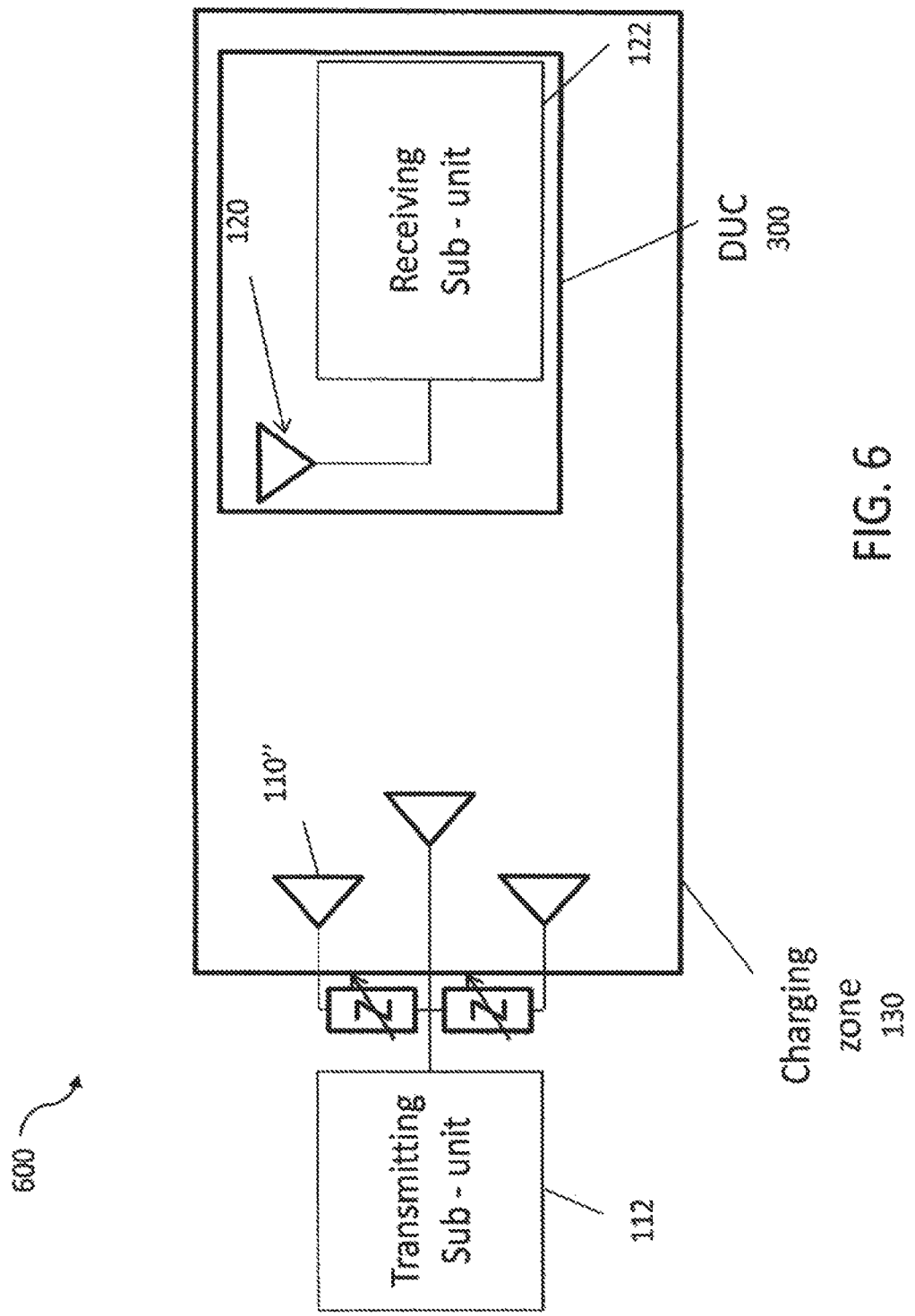
FIG. 6 is a schematic diagram illustrating a wireless charging system comprising an adaptive impedance transmitting antenna configured to allow changing the size and impedance of the antenna while maintaining the same distance from the receiving antenna.

FIG. 6 is a schematic diagram illustrating a wireless charging system 600 comprising an adaptive impedance transmitting antenna 110" (modified transmitting antenna) configured to allow changing the size and impedance of the transmitting antenna 110" while maintaining the same distance from the receiving antenna 120. This can enable achieving the energy transfer that can optimize the efficiency of the charging of a device under charge 300. The transmitting sub-unit 112 generates and transfers the RF signal to the transmitting antenna 110". The charging zone 130 can be defined respectively corresponding to the transmitting antenna 110". The device under charge 300 contains a receiving sub unit 122, which can receive the RF signal from the receiving antenna 120.

A configuration using an adjustable transmitting antenna 110" can enable improving the charging, and more accurately adjust the S11 value. The term "modified transmitting antenna" as used herein refers to a transmitting antenna that can be composed of more than one part that can be operably connected and disconnected in order to create different impedance characteristics of the antenna. By changing the size of the transmitting antenna 110" the impedance (Zta) of the transmitting antenna can change. Additionally, the transmitting antenna 110" can comprise branches that can be functionally attached or detached from the other branches, where any combination of "branches" can provide the transmitting antenna with a different impedance value (Zta).

In summary, the coupling between the transmitting antenna 110" and the receiving antenna 120 and consequently the charging efficiency of a device under charge 300 may be improved by selection and adjustment of the transmitting antennas (to obtain best S11 and S21 values). The charging efficiency can also be improved by adjusting the impedance matching between the transmitting sub-unit 112 for each transmitting antenna configuration in order to obtain the best S11 (and S21) values. Thus, upon positioning a device under charge (DUC) 300 in a charging device (closed, semi-closed, open) the controller 114 can swift through every possible combination of antennas available in the charging system (either a transmitting antenna array or a single transmitting antenna) and can adapt the impedance to each of antenna. The best S11 value obtained can then be used by the controller to select the respective antenna to transmit the RF energy to the device under charge (DUC) 300.

The transmitting and receiving antenna impedances for the charging system setups provided in FIGS. 1, 2, 5 and 6 can be illustrated as Smith charts and units return loss graphs as illustrated in and described with reference to FIGS. 7-32 of the accompanying drawings.

Figure 7:
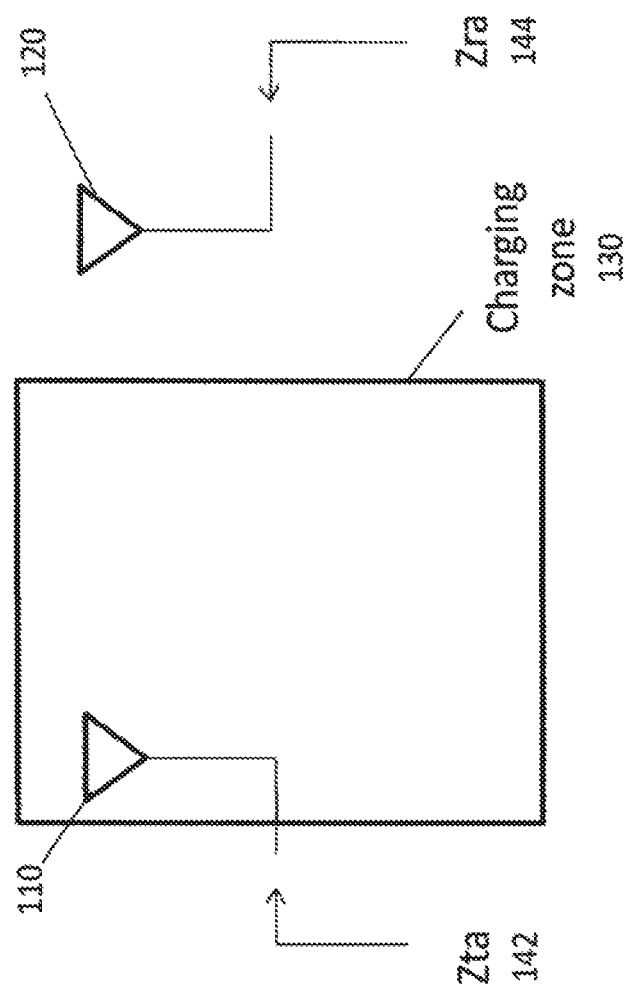
FIGS. 7-11 are Smith charts illustrating the antennas impedance and graphs illustrating the units return loss of the charging system setup of FIG. 1.

FIGS. 7-11 are Smith charts illustrating the antennas impedance and graphs illustrating the units return loss of the charging system setup of FIG. 1. FIG. 7 illustrates the conditions of transmitting antenna 110 and receiving antenna 120, where Zta 142 indicates the input impedance of transmitting antenna 110 and Zra 144 indicates the input impedance of receiving antenna 120. In FIG. 7 the receiving unit 102 is located outside of the charging zone 130. The impedance of each antenna can be graphically displayed by Smith charts in FIGS. 8 and 10. The Smith chart is a graphical aid or monogram designed for electrical and electronics engineers specializing in radio frequency (RF) engineering to assist in solving problems with transmission lines and matching circuits. The use of the Smith chart is still widely used, not only as a problem solving aid, but also as a graphical demonstrator of how various RF parameters behave at one or more frequencies. The Smith chart can be used to display multiple parameters including impedances, admittances, reflection coefficients, S.sub.nn scattering parameters, noise figure circles, constant gain contours and regions for unconditional stability, including mechanical vibrations analysis. The Smith chart is most frequently used at or within the unity radius region.

Figure 8:
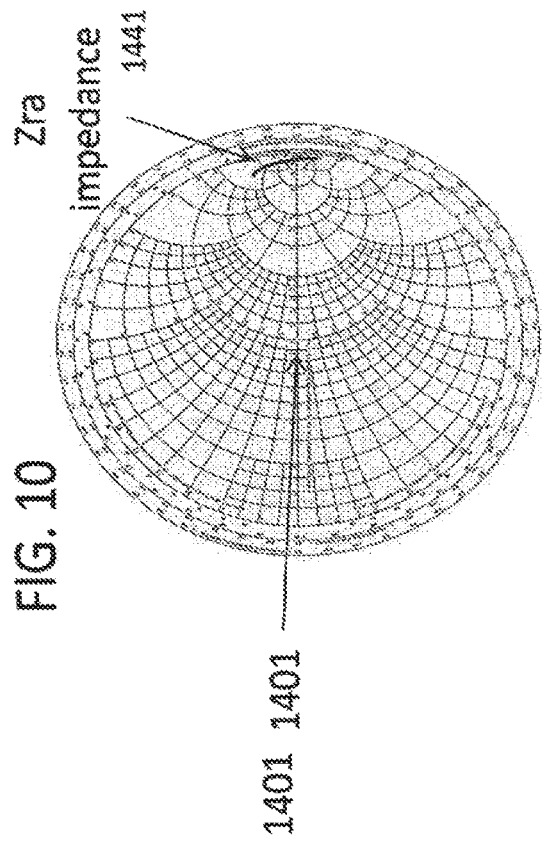
Figure 10:
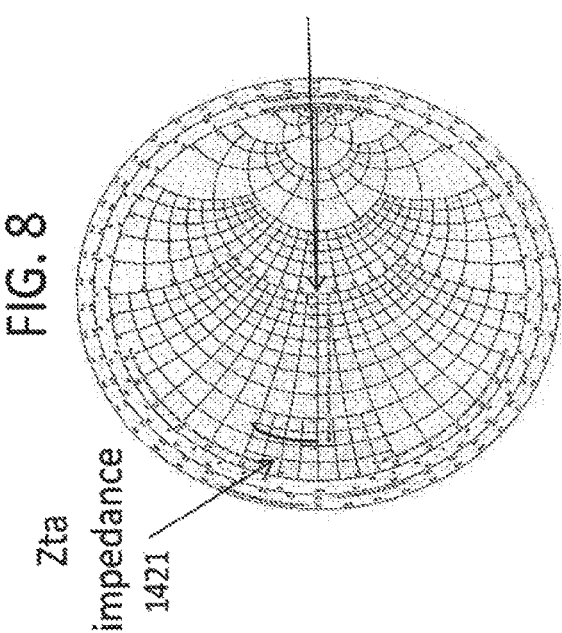

In FIGS. 8 and 10, the Zta impedance 1421 denotes the impedance of transmitting antenna 110 and the Zra impedance 1441 denotes the impedance of receiving antenna 120 according to the set up illustrated in FIG. 1. Assuming that both the transmitting unit 101 and the receiving unit 102 are designed to match the impedance that graphically, the Smith chart describes the center point Z0 1401 of the Smith chart for proper energy transfer and charging, as obtained when both antennas are located within the charging zone and coupling and mutual influence between the antennas occurs. However, when the receiving antenna is located outside the charging zone, the Zta impedance 1421 can be characterized as a short circuit for the given frequency band. Additionally, the Zra impedance 1441 can be characterized as an open circuit for the given frequency band as shown in FIGS. 8 and 10 respectively. The impedance conditions of these antennas illustrate that there is a mismatch condition between the transmitting antenna 110 and the transmitting sub-unit 112, and another mismatch between the receiving antenna 120 and the receiving sub-unit 122.

FIG. 9 illustrates the mismatch condition within the transmitting unit 101, between the transmitting antenna 110 and the transmitting sub-unit 112. The transmitting unit return loss S11 1425 is graphically displayed in decibel units as the ratio between the reflected power that is reflected back from the transmitting antenna to the incident power that being delivered by the transmitting unit, due to impedance mismatch between the transmitting antenna 110 and the transmitting sub-unit 112 for the given frequency band.

Figure 11:
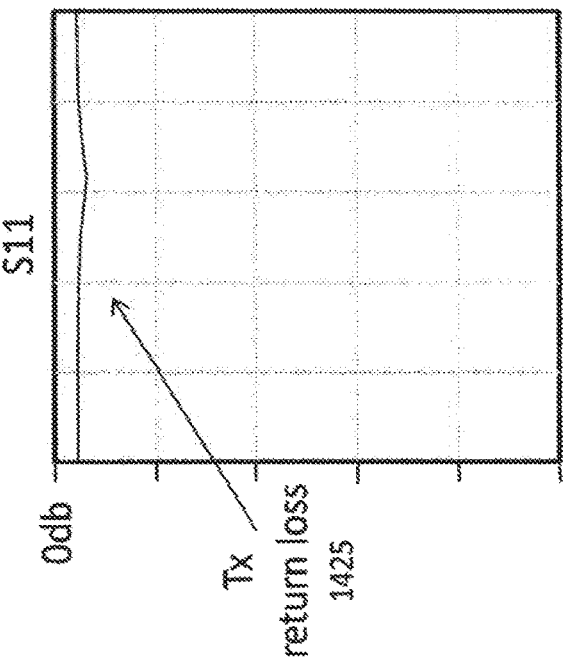

FIG. 11 illustrates the mismatch condition within the receiving unit 102, between the receiving antenna 120 and the receiving sub-unit 122. The return loss S22 of the receiving unit 1445 is graphically displayed in decibel units as the ratio between the reflected power that is reflected back from the receiving unit to the incident power being delivered by the receiving antenna, due to impedance mismatch between the receiving antenna 120 and the receiving sub-unit 122 for the given frequency band.

Figure 12:
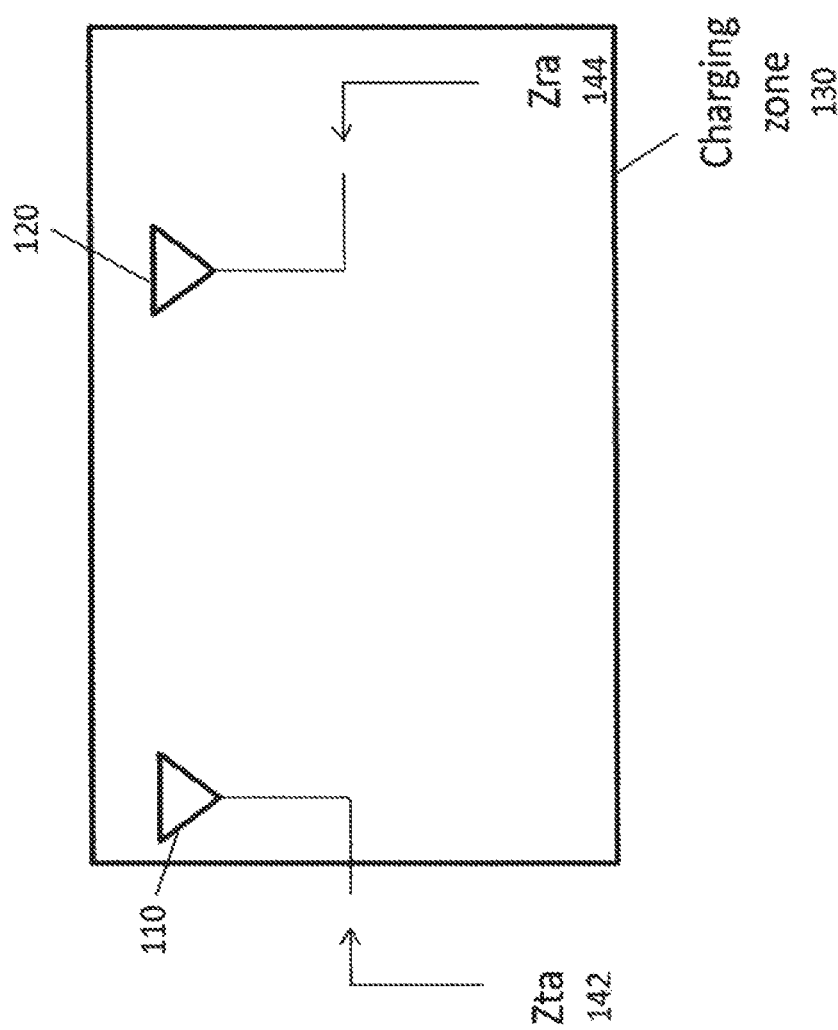

FIGS. 12-16 are Smith charts illustrating the antennas impedance and graphs illustrating the units return loss of the charging system setup of FIG. 2, in which the device under charge (DUC) 300 is located within the charging zone 130. FIG. 12 illustrates the conditions of transmitting antenna 110 and receiving antenna 120. As shown in the FIG. 12, Zta 142 indicates the input impedance of the transmitting antenna 110, while Zra 144 indicates the input impedance of the receiving antenna 120. The impedance of each of the antennas is graphically displayed by a Smith chart. The Zta impedance 1421 is a graphical display of the transmitting antenna 110 impedance. The Zra impedance 1441 is a graphical display of the receiving antenna 120 impedance in the same system setup. Assuming that the transmitting unit 101 and the receiving unit 102 are designed to match the impedance value of Z0 that graphically describe by the center point Z0 1401 of Smith chart for proper energy transfer and charging between the units, coupling and mutual influence between the transmitting and receiving antennas occur. Therefore, the Zta impedance 1421 characterized as match to the center point Z0 1401 of Smith chart for the given frequency band (FIG. 13), and Zra impedance 1441 characterize as match to the center point Z0 1401 of Smith chart for the given frequency band (FIG. 15). As to the impedance conditions of the antennas on FIGS. 13 and 15 (based on the assumption that both units 101 and 102 are designed to match a specific impedance that is graphically displayed as the center point Z0 1401 of Smith chart), a match condition between the transmitting antenna 110 to the transmitting sub-unit 112 and a match condition between the receiving antenna 120 and the receiving sub-unit 122 occurs.

The match within the transmitting unit 101 is expressed by return loss S11 1425 values (FIG. 14) in decibel units. The return loss is the ratio between the reflected power that reflects back from the transmitting antenna to the incident power being delivered by the transmitting sub-unit, due to impedance match between the transmitting antenna 110 and the transmitting sub-unit 112.

The match within the receiving unit 102 is expressed by return loss (S22) 1445 values (FIG. 16) in decibel units and denoted as the ratio between the reflected power that reflect back from the receiving sub-unit to the incident power being delivered by the receiving antenna, due to impedance match between the receiving antenna 120 and the receiving sub-unit 122.

FIGS. 17A and 17B are graphs illustrating the energy transfer efficiency between the transmitting unit 101 and receiving unit 102 of the charging system of FIG. 3 in accordance with the two setups illustrated in FIGS. 1 and 2 respectively. (i.e. DUC 300 positioned outside the charging zone 130 (unmatched system (FIG. 17A)) and DUC 300 positioned within the charging zone 130 (matched system (FIG. 17B))). As shown in these figures, the energy transfer efficiency demonstrated as insertion loss (S21) 1450 provides an indication of the ratio between the received power to the transmitted power, i.e. the amount of energy received by the receiving unit 102 relative to the amount of power being transmit by the transmitting unit 101. In a mismatch condition, where there is no coupling and mutual influence condition between the transmitting antenna 110 and the receiving antenna 120, the insertion loss 1450 value is very high as being graphically displayed in FIG. 17A. i.e. the energy transfer efficiency S21 is extremely low. However, in a match condition where there is a coupling and mutual influence condition between the transmitting antenna 110 and the receiving antenna 120, the insertion loss 1450 value is very low (as shown in FIG. 17B) i.e. the energy transfer efficiency S21 is extremely high.

Figure 27A:
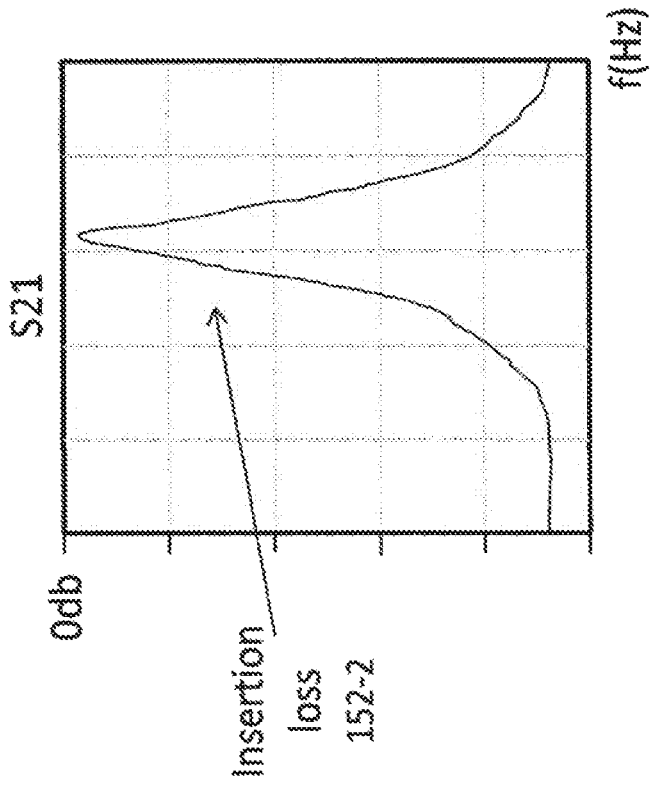
FIGS. 27A and 27B are schematic diagrams illustrating the energy transfer efficiency between the transmitting units and receiving unit.
Figure 27B:
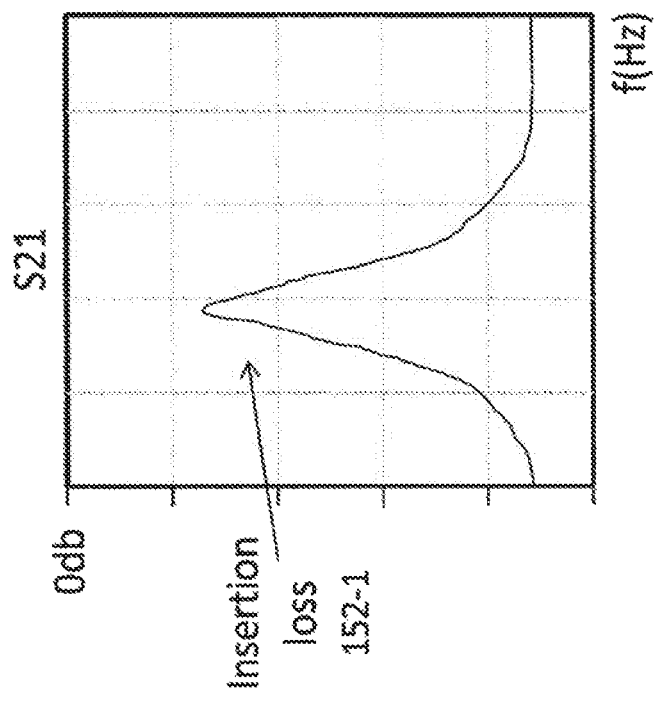

FIGS. 18 to 22 are Smith charts illustrating the antennas impedance and graphs illustrating the units return loss of the charging system setup of FIG. 5, illustrating a charging system having a transmitting antenna array with two transmitting antennas 110 and 110'. Also shown, are the insertion loss values obtained by operation of each of the transmitting units in the array (FIGS. 27A and 27B). In order to achieve the energy transfer that results in the most efficient charging of the device under charge, the transmitting unit of the charging system of the current subject matter is variable as is described. It is understood that the transmitting antenna array may comprise a various number of transmitting units and types thereof.

Figure 18:
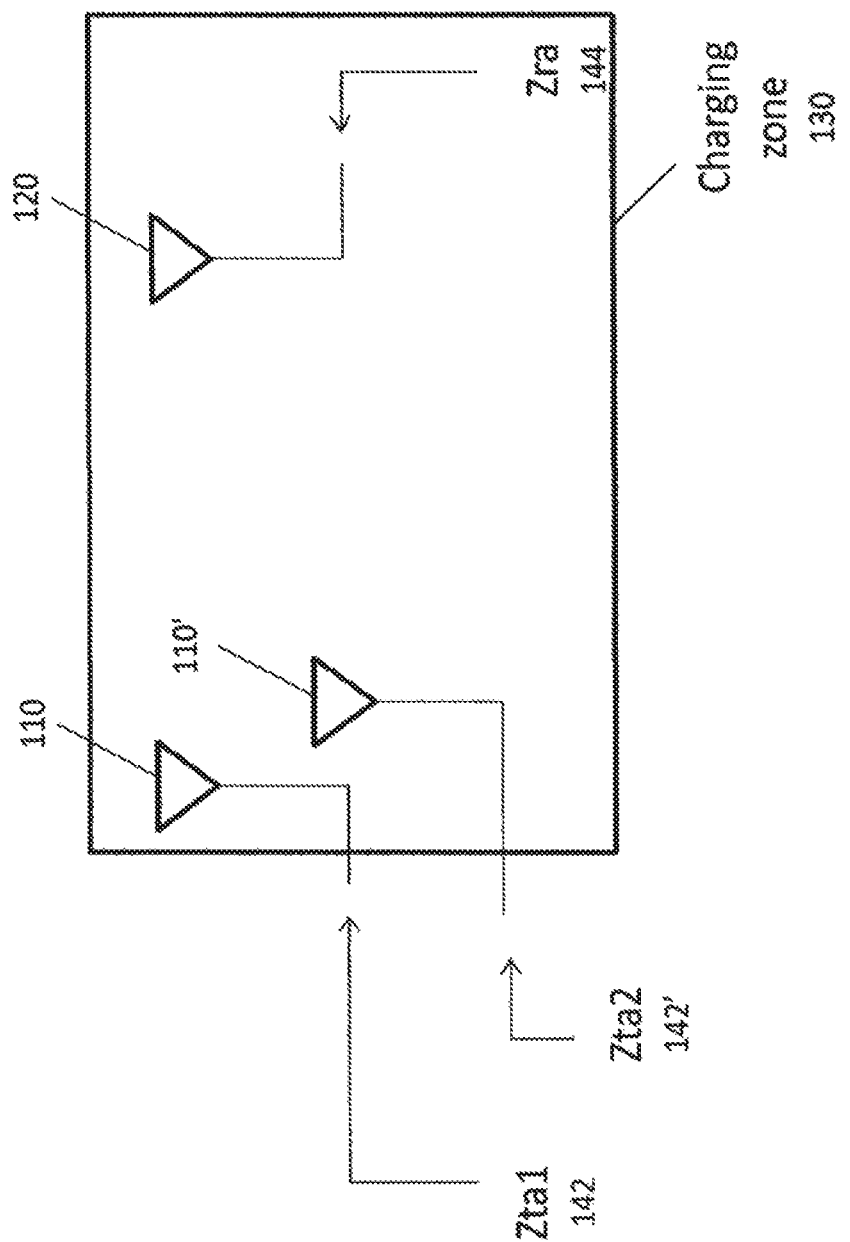

In this setup provided in FIG. 5, the condition of transmitting antenna 110, transmitting antenna 110', and receiving antenna 120 in accordance with the setup of FIG. 5 are illustrated in FIG. 18. Shown in FIG. 18, Zta1 142 indicates the input impedance of transmitting antenna 110, Zta2 142' indicates the input impedance of transmitting antenna 110', and Zra 144 indicates the input impedance of the receiving antenna 120, wherein the receiving unit is located within the charging zone 130.

FIGS. 19 and 21 are Smith chart illustrations of the impedance of each of the antennas, wherein, Zta1 impedance 1421-1 denotes the impedance of the transmitting antenna 110 matched to the center point Z0 1401 of Smith chart for a given frequency band, and the Zra impedance 1441-1 denotes the impedance of the receiving antenna 120 matched to the center point Z0 1401 of Smith chart for the same given frequency band, according to the system setup describe in FIG. 5, assuming that both, transmitting and receiving units, are designed to match the impedance described by the center point Z0 1401 of Smith chart for proper energy transfer and charging, i.e. when both units are located within the charging zone, and coupling and mutual influence between the transmitting and the receiving antennas occur.

As to the impedance condition of the antennas in this setup, based on the assumption that all units are designed to match a specific impedance that is graphically displayed as the center point Z0 1401 of Smith chart, no suitable match condition between the transmitting antenna 110 of the antenna array to the transmitting sub-unit 112 and the receiving antenna 120 and the receiving sub-unit 122 occurs. The match condition within the transmitting unit 101, between the transmitting antenna 110 and the transmitting sub-unit 112, is illustrated in FIG. 20. Return loss (S11) 1425-1 measured in decibel units is the ratio between the reflected power that reflects back from the transmitting antenna to the incident power delivered by the transmitting unit due to unsuitable impedance matching between the transmitting antenna 110 and the transmitting sub-unit 112. The receiving unit return loss (S22) 1445-1 illustrated in FIG. 22 is the ratio between the reflected power that reflect back from the receiving sub-unit to the incident power delivered by the receiving antenna, due to unsuitable impedance match between receiving antenna 120 and sub-receiving unit 122.

FIGS. 23 and 25 are Smith charts showing the impedance of transmitting antenna 110' Zta2 1421-2 and receiving antenna 120 Zra 1441-2 respectively, assuming that both units, transmitting unit 101' and receiving unit 102, are designed to match the impedance graphically describe by the center point Z0 1401 of Smith chart for proper energy transfer and charging, i.e. when both units are located within the charging zone, and coupling and mutual influence between the antennas occurs. In other words, for the setup illustrated in FIG. 5, the Zta2 impedance 1421-2 is characterized as a match to the center point Z0 1401 of the Smith chart for the given frequency band, while the Zra impedance 1441-2 is characterized as match to the center point Z0 1401 of Smith chart for the given frequency band, as illustrated in FIGS. 23 and 25, respectively. The impedance condition of the antennas on FIGS. 23 and 25 according to the scenario describe in FIG. 5 is based on the assumption that both units 101' and 102 were designed to match a specific impedance that is graphically displayed as the center point Z0 1401 of Smith chart, a match condition between the transmitting antenna 110' to the transmitting sub-unit 112' and receiving antenna 120 and the receiving subunit 122 occurs.

The match condition within the transmitting unit 101', between the transmitting antenna 110' and the transmitting sub-unit 112', is described in FIG. 24. Transmitting unit 101' return loss 1425-2 (decibel units) is the ratio between the reflected power that reflect back from the transmitting antenna to the incident power that being delivered by the transmitting unit, duo to impedance match between the transmitting antenna 110' and the transmitting sub-unit 112'. Receiving unit return loss 1445-2 described in FIG. 26 (decibel units) is the ratio between the reflected power being reflected back from the receiving unit to the incident power that being delivered by the receiving antenna, due to impedance match between the receiving antenna 120 and the receiving sub-unit 122.

As mentioned above, FIGS. 27A and 27B schematically describe the energy transfer efficiency between the transmitting unit 101 and receiving unit 102, and the energy transfer efficiency between the transmitting unit 101' and the receiving unit 102 for the charging system setup illustrated in FIG. 5. The energy transfer efficiency is graphically shown as insertion loss 152-1 that indicates about the ratio between the received power to the transmitted power, i.e. the amount of energy received by the receiving unit 102 respectively to the amount of power that being transmit by the transmitting unit 101. According to the unsuitable matching condition describe in FIGS. 20 and 22, where there is not suitable coupling and mutual influence condition between the transmitting antenna 110 and the receiving antenna 120, the insertion loss 152-1 is not very low as shown in FIG. 27A, i.e. the energy transfer efficiency S21 is not very high.

According to the match condition describe on FIGS. 23 and 25, where there is a coupling and mutual influence condition between the transmitting antenna 110' and the receiving antenna 120, the insertion loss 152-2 is very low as shown in FIG. 27B, i.e. energy transfer efficiency S21 is extremely high. In that case, the controller of charging system 500 will determine that the transmitting unit 101' will transfer the RF energy to receiving unit 102.

Figure 28:
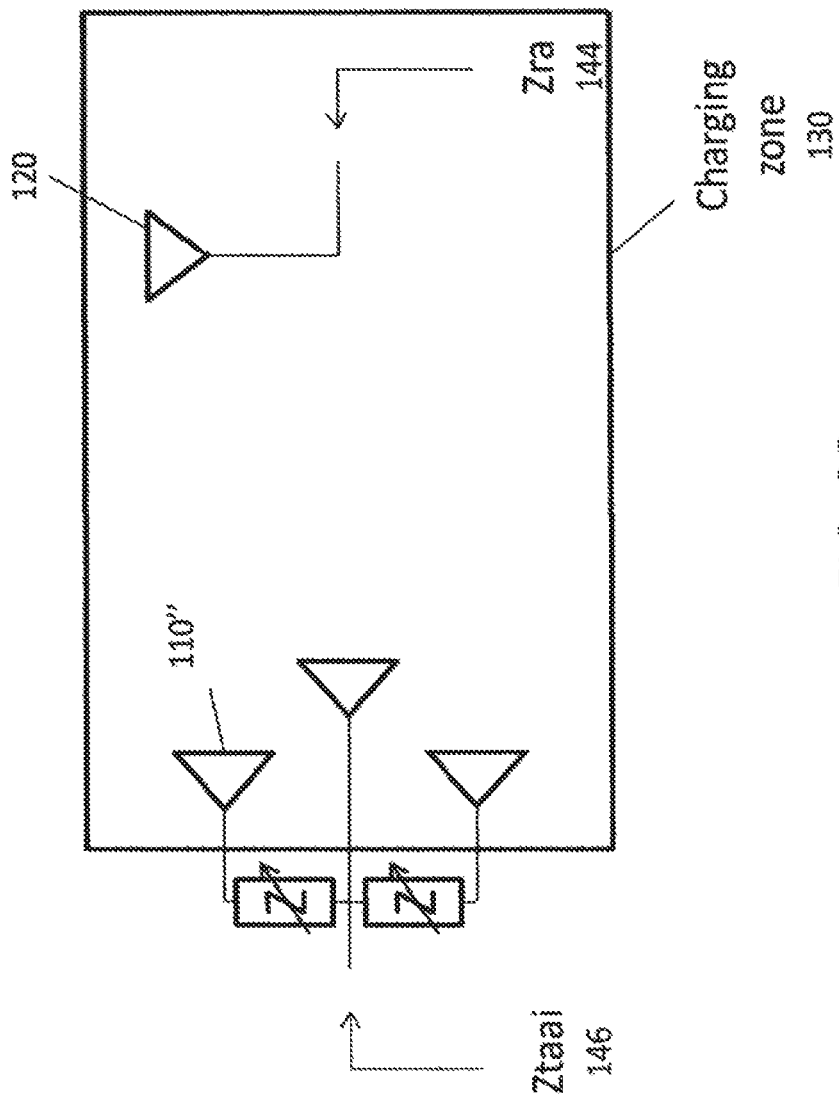
FIGS. 28-32 are Smith charts illustrating the antennas impedance and graphs illustrating the units return loss of the charging system setup of FIG. 6.

FIGS. 28 to 32 illustrate the antennas impedance Smith charts presentations and the units return loss of the charging system setup of FIG. 6. FIG. 28 illustrates the condition of transmitting antenna 110" and receiving antenna 120 in the setup of FIG. 6. Ztaai 146 indicates the input impedance of the transmitting antenna 110" in a specific adjusted impedance state, and Zra 144 indicates the input impedance of the receiving antenna 120, according to the scenario where the receiving unit 102 is located within the charging zone 130.

Figure 31:
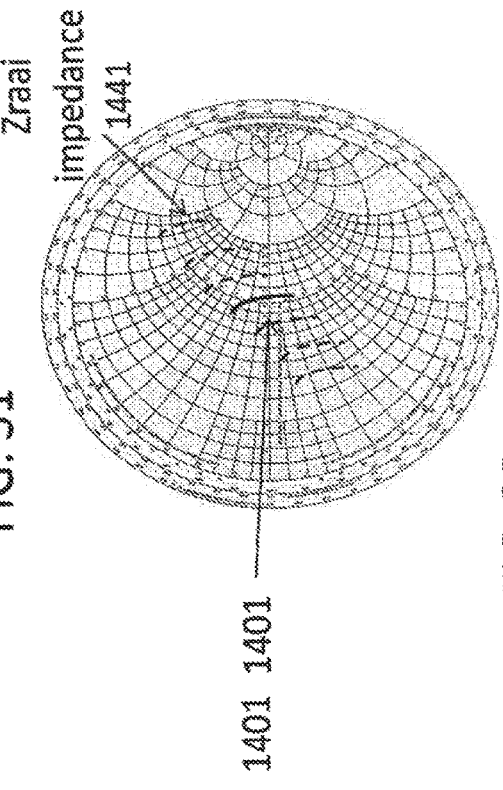
Figure 29:
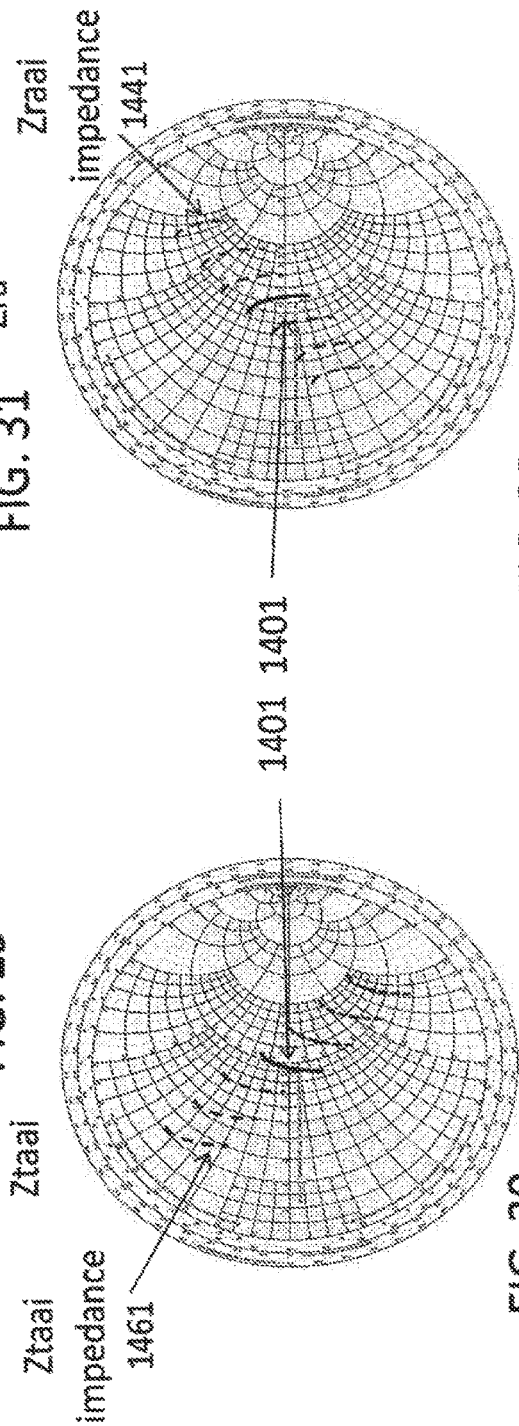

FIGS. 29 and 31 are Smith chart illustrations of the impedance of each of the antenna, respectively, wherein, the Ztaai impedance 1461 is a graphic display of the transmitting antenna 110" numerous impedance adjustment states according to the scenario described with reference to FIG. 6. The Zraai impedance 1441 is a graphic display of the receiving antenna 120 impedance states respectively to the states of the transmitting antenna 110" according to the scenario describe in FIG. 6, assuming that both, transmitting unit 101 and receiving unit 102, are designed to match the impedance that graphically describe by the center point Z0 1401 of Smith chart for proper energy transfer and charging, i.e. when both are locate within the charging zone, and coupling and mutual influence between the antennas occurs.

Ztaai impedance 1461 is characterized as match to the center point Z0 1401 of Smith chart in certain antenna adaptive impedance state for the given frequency band and Zraai impedance 1441 is characterize as match to the center point Z0 1401 of Smith chart respectively to the adaptive impedance state of the transmitting antenna 110" for the given frequency band.

The impedance condition of the antennas on FIG. 29 and FIG. 31, according to the setup of FIG. 6, and based on the assumption that both units were designed to match a specific impedance that is graphically displayed as the center point Z0 1401 of Smith chart, a several match condition between the transmitting antenna 110" to the transmitting sub-unit 112 and receiving antenna 120 and the receiving sub-unit 122 occurs.

Figure 32:
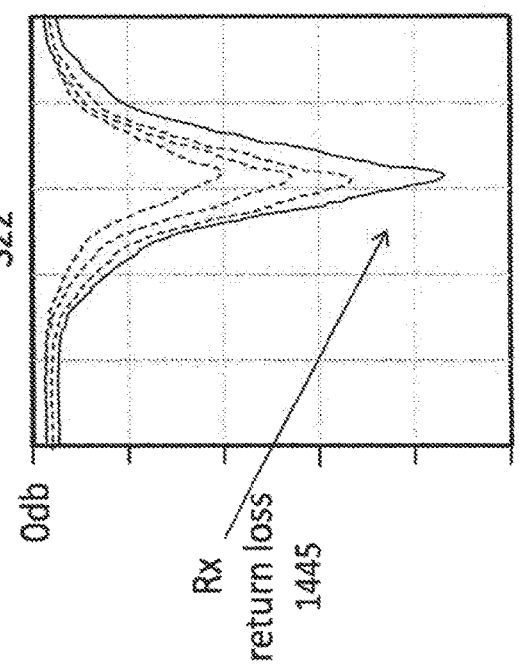
Figure 30:
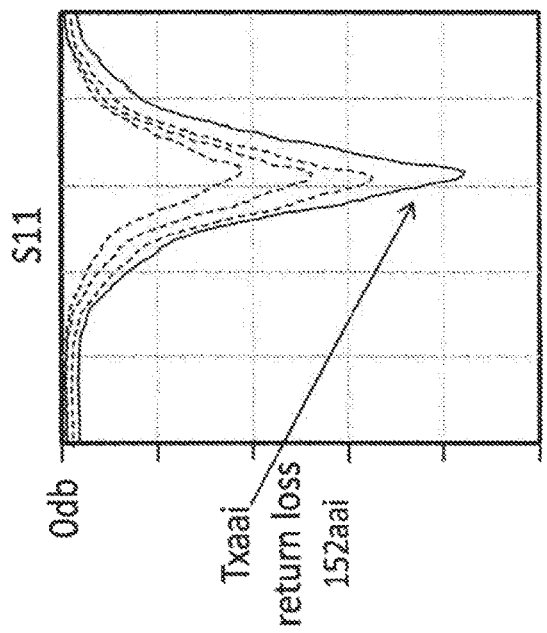

Several matching condition within the transmitting unit 101, between the transmitting antenna 110" and the transmitting sub-unit 112, is described in FIG. 30. Transmitting unit (Txaai) return loss 152*aai* is the ratio between the reflected power being reflected back from the transmitting antenna to the incident power being delivered by the transmitting unit, due to several impedance matching states between the transmitting antenna 110" and the transmitting sub-unit 112. Receiving unit return loss 1445 is the ratio between the reflected power that reflect back from the receiving unit to the incident power that being delivered by the receiving antenna, duo to several impedance matching states, respectively to the adaptive impedance state of the transmitting antenna 110", between the receiving antenna 120 and the receiving unit 122 (FIG. 32).

Figure 33:
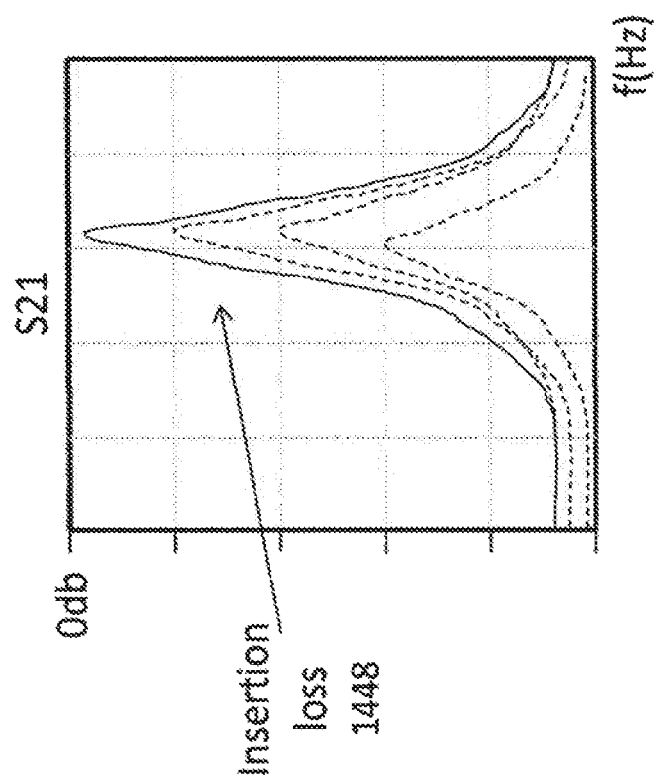
FIG. 33 is a graph illustrating the energy transfer efficiency between the transmitting unit and receiving unit.

FIG. 33 is a graph illustrating the energy transfer efficiency between the transmitting unit 101 and receiving unit 102 respectively to the adaptive impedance state of the transmitting antenna 110", regarding the charging scenarios describe in FIG. 6. The energy transfer efficiency S21 is graphically displayed as insertion loss 1448, indicates about the ratio between the received power to the transmitted power, i.e. the amount of energy received by the receiving unit 102 respectively to the amount of power that being transmit by the transmitting unit 101 in several adaptive impedance states of the transmitting antenna 110". According to several matching state conditions described in FIGS. 29 and 31, where there are several coupling and mutual influence conditions between the transmitting antenna 110" and the receiving antenna 120, respectively to the adaptive impedance state of the transmitting antenna 110", the insertion loss 1448 is very low as being graphically displayed in FIG. 33 for a certain state of adaptive impedance of the transmitting antenna 110", i.e. energy transfer efficiency S21 is very high. The controller of charging system 600 will determine that the combination of the modified antenna 101' that provided the highest energy transfer efficiency S21 value will transfer the RF energy to receiving unit 102.

FIGS. 34 to 38 are schematic illustrations of the wireless charging system 100 of FIG. 3 following adaptive impedance matching process that is performed after the electromagnetic parameters of the system are all set. The impedance matching of the charging system illustrated in these figures is configured to provide the final adaptation of the electronic components of the wireless charging system so as to allow maximal efficiency of the charging process in the preferred setup as selected according to the electromagnetic components setup of the wireless charging system.

FIG. 34 is a Smith chart presentation of the impedance condition of the transmitting unit before and after impedance matching. In this graphic presentation, impedance of the transmitting unit Ztxaim is matched to the impedance that is graphically described by the center point Z0 1401 of the Smith chart for proper energy transfer and charging, i.e. when both units, the transmitting unit 102 and the receiving unit 102 are located within the charging zone and coupling and mutual influence between the antennas occurs, while before the impedance matching Ztx 1491 is located within the dashed circle 1490 around the Z0 point. In a similar manner, the impedance condition of the receiving unit before and after impedance matching Zraim is presented in FIG. 36. The impedance of the receiving unit Zraim is matched to the impedance that graphically is described by the center point Z0 1401 of the Smith chart for proper energy transfer and charging, i.e. when both units, the transmitting unit 102 and the receiving unit 102 are locate within the charging zone and coupling and mutual influence between the antennas occurs, while before the impedance matching Zrx 1495 is located within the dashed circle 1490 around the Z0 point.

FIGS. 35 and 37 are schematic illustrations of the return loss S11 of the transmitting unit Tx and the return loss S22 of the receiving unit Rx respectively, following adaptive impedance matching of the units (strict line) and before that in a deferent partially matched situations (dashed lines). As shown in the figures, upon matching of the impedance between the units, the S11 and the S22 levels (in decibels) are improved in a manner that the energy transfer and the charging process in the specific setup of the wireless charging system is optimal. As noted from the figures, when the transmitting and receiving antennas are coupled, the energy transfers from the transmitting unit to the receiving unit in a very narrow frequency band such that the transmission pattern is characterized as a peak. Constant loss in the system is usually expressed as a constant by a wide frequency band (−dB) value that reflects the loss. The receiving unit 102 is adapted to a certain power i.e. the desired efficiency will be obtained only when the inserted power is matched to the system impedance. In such scenario, the compliance of the system is gradual until the opening point of the diode of the power conditioning circuit in which the receiving unit is capable to uptake the energy. Before the opening of the diode, the constant loss of the charging device and the DUC are minor in any transmission values. Upon opening of the diode the absolute values of S11 increase until full conduction is reached that reflects the optimal operating point of the system.

During the charging process, while the system obtained a maximal energy transfer condition (strict line), several changes may occur (dashed lines). The impedance of the secondary cell is changed during the charging process, those impedance changes reflect and effect the matching condition between the receiving antenna and the receiving unit i.e S22 is changed (dashed lines) due to the increasing of the reflect power to the receiving antenna from the receiving unit. The changes occurring in S22 reflect and affect S21 by decreasing the transfer efficiency S21 and also the return loss of the transmitting unit S11, due to the coupling condition between the antennas. The changes in the return loss Si 1 (dashed lines) leads to mismatch between the transmitting antenna and the transmitting sub-unit in this scenario, the adaptive impedance unit in the transmitting unit is adjusting the transmitting sub-unit and the transmitting antenna to the new condition in order to maintain and restore the maximal energy transfer efficiency condition with the receiving unit.

Figure 38:
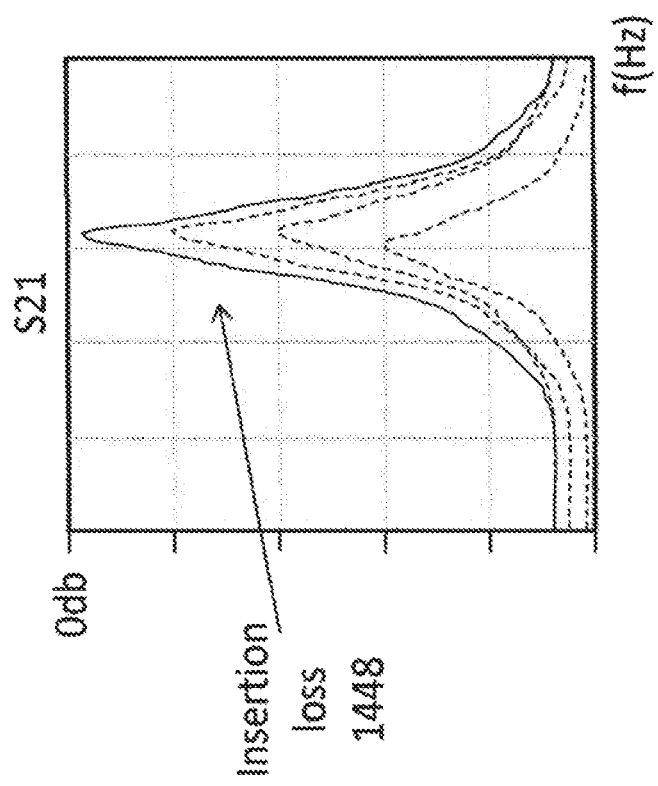

FIG. 38 describes the energy transfer efficiency between the transmitting unit and the receiving unit respectively to the adaptive impedance state of the units until the optimal impedance match is achieved. The energy transfer efficiency is graphically displayed as insertion loss 1448, and is the ratio between the received power to the transmitted power, i.e. the amount of energy received by the receiving unit 102 respectively to the amount of power that being transmit by the transmitting unit 101 in several adaptive impedance state of the transmitting antenna. The insertion loss 1448 is very low as graphically displayed in FIG. 38 upon reaching optimal adaptive impedance match, i.e. energy transfer efficiency S21 is very high.

FIGS. 39 and 40 are graphs illustrating the return loss for two receiving units, in multiple devices under a charge scenario. In this scenario there can be multiple receiving units 102 in the charging zone. The transmitting unit can recognize the compliance state (frequency and impedance) of each receiving unit separately (illustrated in FIGS. 39 and 40 for two different receiving units) and can save the recognized values. Thereafter, the impedance of the transmitting unit, using previously described methods, can create a common compliance point that is ideal to both receivers. FIG. 41 is a graph illustrating the transmitting unit return loss S11. FIG. 42 is a graph illustrating the common compliance point that is ideal to both receiving units on a return loss diagram. At this point, the two receiving units can begin charging until the transmitting unit detects changes in the S11 values. When such a change occurs, the transmitting unit can again start checking the compliance of each of the receiving units separately (as illustrated in FIGS. 39 and 40) and analyze the change in each of them (the charging state of each of the receiving units based on S11 values of each). In order to maintain the amount of power required for each of the receivers, the transmitting unit may perform changes and shift the common compliance point toward the receiving unit that requires more power than the other. The controller 114 in the transmitting unit 102 is adapted to respond to the degree of impedance mismatch falling below the threshold at each of two sets of the plurality of frequencies, each set being in a frequency region narrower than the frequency range by commencing a multiple device charging process.

The transmitting unit may adapt the nature of the common transmission at the overlapping area created between the two compliance points of each of the receivers separately, so as to transmit the required power for each of the receivers together. Each time that the transmitting unit measures a change, the measurement is performed for each of the receiving units separately (according to the data obtained in previous measurement of the same receiving unit) in order to view the changes in each specific device under charge (DUC) and to analyze the required charging duration required for each receiving unit. According to the analysis the transmitting unit changes the transmitting parameters from the common compliance point toward the compliance point of the receiving unit that requires more power and keeping transmitting a lower power toward the other receiving unit according to its needs.

It should be clear that the description of the embodiments and attached Figures set forth in this specification serves only for a better understanding of the invention, without limiting its scope. It should also be clear that a person skilled in the art, after reading the present specification could make adjustments or amendments to the attached figures and above described embodiments that would still be covered by the current subject matter.

The invention claimed is:

1. A wireless charging device comprising a transmitter coupled to at least one transmitting antenna and operable to cause the at least one transmitting antenna to emit electromagnetic radiation; a conductive structure adapted to confine the electromagnetic radiation to a charging zone; and a detector for detecting a degree of impedance mismatch between the transmitter and the at least one transmitting antenna;
   wherein the wireless charging device further comprises a controller coupled to the detector so as to receive at least one signal indicating the degree of impedance mismatch from the detector;
   wherein the controller is adapted to respond to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range; and
   wherein the controller is adapted to respond to either one of the following:
   (a) to a reflection coefficient S11 from the degree of impedance mismatch and to cause the device to indicate the absence of a device to be charged in the charging zone if the reflection coefficient S11 rises above a threshold value;
   (b) to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range;
   (c) to respond to the degree of impedance mismatch falling below the threshold value of at least some of the plurality of frequencies by causing the device to indicate the presence of a non-chargeable, parasitic load in the charging zone;
   (d) to respond to the degree of impedance mismatch falling below the threshold at each of a set of the plurality of frequencies in a frequency region narrower than the frequency range by commencing a charging process; or
   (e) on commencement of the charging process to modify the power level at which the transmitter causes the at least one transmitting antenna to emit electromagnetic radiation whilst monitoring the degree of impedance mismatch to determine the power level at which the degree of impedance mismatch exhibits a peak and then setting the power level to that value.

2. The wireless charging device of claim 1, wherein the conductive structure is a radiofrequency shielded structure within which the at least one transmitting antenna is located, the charging zone being located within an internal volume of the radiofrequency shielded structure.

3. The wireless charging device of claim 1, wherein the conductive structure defines a partially enclosed volume within which the at least one transmitting antenna is located and which has an open region allowing for introduction of a device to be charged into the partially enclosed volume, the charging volume occupying at least part of the partially enclosed volume.

4. The wireless charging device of claim 1, wherein the conductive structure is a planar structure on which the at least one transmitting antenna is located, whereby the charging zone occupies a volume surrounding the at least one transmitting antenna.

5. The wireless charging device of claim 1, wherein the at least one antenna is either one of an array of antennae, each of which may be selected for emitting electromagnetic radiation to modify the charging zone, or an adaptive impedance transmitting antenna, the impedance of which is variable to modify the charging zone.

6. The wireless charging device of claim 1, wherein the detector monitors incident power transmitted to the at least one transmitting antenna and reflected power received from the at least one transmitting antenna, the ratio of these indicating the impedance mismatch between the transmitter and the at least one transmitting antenna.

7. The wireless charging device of claim 1, wherein the controller is adapted during the charging process to monitor the degree of impedance mismatch and to respond to variations in the degree of impedance mismatch in at least one of the following ways:
  a) by varying the power level at which the transmitter causes the at least one transmitting antenna to emit electromagnetic radiation;
  b) by varying the frequency at which the transmitter causes the at least one transmitting antenna to emit electromagnetic radiation;
  c) by controlling an adaptive impedance matching unit coupled to the transmitter and the transmitting antenna; and
  d) by coupling at least one antenna of an antenna array to the transmitter and/or by adapting the impedance of an adaptive impedance antenna coupled to the transmitter.

8. The wireless charging device of claim 1, wherein the controller is adapted to respond to the degree of impedance mismatch falling below the threshold at each of two sets of the plurality of frequencies, each set being in a frequency region narrower than the frequency range by commencing a multiple device charging process.

9. The wireless charging device of claim 7, wherein the controller is further adapted on commencement of the charging process to set the frequency at which the transmitter causes the at least one transmitting antenna to emit electromagnetic radiation to a value between frequency values within each set at which the impedance mismatch exhibits a peak.

10. The wireless charging device of claim 7, wherein the controller is further adapted to respond to changes in impedance mismatch by adjusting the frequency at which the transmitter causes the at least one transmitting antenna to emit electromagnetic radiation to a value closer to one of the two peaks than the other.

11. A wireless charging system comprising:
  (i) a wireless charging device having a transmitter coupled to at least one transmitting antenna and operable to cause the at least one transmitting antenna to emit electromagnetic radiation; a conductive structure adapted to confine the electromagnetic radiation to a charging zone; and a detector for detecting a degree of impedance mismatch between the transmitter and the at least one transmitting antenna;
  wherein the wireless charging device further comprises a controller coupled to the detector so as to receive at least one signal indicating the degree of impedance mismatch from the detector;
  wherein the controller is adapted to respond to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range; and
  wherein the controller is adapted to respond to either one of the following:
    (a) to a reflection coefficient S11 from the degree of impedance mismatch and to cause the device to indicate the absence of a device to be charged in the charging zone if the reflection coefficient S11 rises above a threshold value;
    (b) to the degree of impedance mismatch falling below a threshold value by varying a transmission frequency at which the transmitter causes the at least one transmitting antenna to emit electromagnetic radiation over a frequency range and measuring the degree of impedance mismatch at a plurality of frequencies across the frequency range;
    (c) to respond to the degree of impedance mismatch falling below the threshold value of at least some of the plurality of frequencies by causing the device to indicate the presence of a non-chargeable, parasitic load in the charging zone;
    (d) to respond to the degree of impedance mismatch falling below the threshold at each of a set of the plurality of frequencies in a frequency region narrower than the frequency range by commencing a charging process;
    (e) on commencement of the charging process to modify the power level at which the transmitter causes the at least one transmitting antenna to emit electromagnetic radiation whilst monitoring the degree of impedance mismatch to determine the power level at which the degree of impedance mismatch exhibits a peak and then setting the power level to that value; and
  (ii) a receiver comprising a receiving antenna, a power conditioning circuit adapted to receive an electrical signal from the receiving antenna and condition the electrical signal into a form suitable for charging or powering a load, and a connector for coupling the power conditioning circuit to the load, in use, wherein the charging zone includes a region in which the electromagnetic radiation is concentrated relative to the remainder of the charging zone.

12. The wireless charging system of claim 11, wherein the controller in the wireless charging device is further adapted to monitor the charging state of a battery in a chargeable unit coupled to the receiver by monitoring changes in the degree of impedance mismatch and to vary the power level and/or frequency at which the transmitter causes the at least one transmitting antenna to emit electromagnetic radiation and/or to control an adaptive impedance matching unit coupled to the transmitter and the transmitting antenna to match the impedance of the transmitter and the transmitting antenna.

13. The wireless charging system of claim 11, wherein the controller in the wireless charging device is further adapted to decrease the power level at which the transmitter causes the at least one transmitting antenna to emit electromagnetic radiation from a starting value for predefined period of time before returning the power level to the starting value.

14. The wireless charging system of claim 13, wherein the controller in the wireless charging device is adapted to determine an insertion loss S21 value by calculating the ratio of the difference in the values of S11 during the predefined period and prior to the predefined period to the value of S11 prior to the predefined period.

15. The wireless charging system of claim 11, wherein the power conditioning circuit of the receiver further comprises an impedance matching circuit having only passive electrical components.

16. The wireless charging system of claim 11, wherein the receiver further comprises a switch for interrupting the reception of the electrical output from the receiving antenna by the power conditioning circuit.

17. A wireless charging device according to claim 11, wherein the controller is adapted to respond to the degree of impedance mismatch falling below the threshold at each of two sets of the plurality of frequencies, each set being in a frequency region narrower than the frequency range by commencing a multiple device charging process.

18. The wireless charging system of 11 wherein the wireless charging device further comprises a power transmitter coupled to a transmitting antenna for transmitting energy to the chargeable unit, a monitor for monitoring a reflection coefficient S11 of the transmitting antenna, and a controller adapted to respond to the monitored S11 value in at least one of the following ways:
   (a) by varying the power level at which the power transmitter causes the transmitting antenna to transmit energy;
   (b) by varying the frequency at which the power transmitter causes the transmitting antenna to transmit energy;
   (c) by controlling an adaptive impedance matching unit coupled to the power transmitter antenna; and
   (d) by coupling at least one antenna of an antenna array to the power transmitter and/or by adapting the impedance of an adaptive impedance antenna coupled to the power transmitter.

\* \* \* \* \*